US008397303B2

(12) United States Patent
Ochi et al.

(10) Patent No.: US 8,397,303 B2
(45) Date of Patent: Mar. 12, 2013

(54) MEMORY CONTROLLER, NONVOLATILE STORAGE SYSTEM, AND DATA MANAGEMENT METHOD

(75) Inventors: Makoto Ochi, Osaka (JP); Hiroki Etoh, Osaka (JP); Masahiro Nakanishi, Kyoto (JP); Hirokazu So, Osaka (JP); Hiroshi Sakurai, Osaka (JP); Masato Suto, Osaka (JP)

(73) Assignee: Panasonic Corporation, Osaka (JP)

( * ) Notice: Subject to any disclaimer, the term of this patent is extended or adjusted under 35 U.S.C. 154(b) by 772 days.

(21) Appl. No.: 12/531,575

(22) PCT Filed: Feb. 10, 2009

(86) PCT No.: PCT/JP2009/000522
§ 371 (c)(1),
(2), (4) Date: Sep. 16, 2009

(87) PCT Pub. No.: WO2009/128189
PCT Pub. Date: Oct. 22, 2009

(65) Prior Publication Data
US 2010/0146633 A1 Jun. 10, 2010

(30) Foreign Application Priority Data
Apr. 18, 2008 (JP) ................................. 2008-108695

(51) Int. Cl.
*G06F 21/00* (2006.01)
(52) U.S. Cl. .......................................... 726/26; 713/164
(58) Field of Classification Search ........................ None
See application file for complete search history.

(56) References Cited

U.S. PATENT DOCUMENTS

| 6,014,730 | A | * | 1/2000 | Ohtsu ............................. 711/170 |
| 6,434,103 | B1 | | 8/2002 | Shitara et al. |
| 6,651,171 | B1 | * | 11/2003 | England et al. ................ 713/193 |
| 7,000,039 | B2 | * | 2/2006 | Ishibashi ........................... 710/74 |
| 7,320,008 | B1 | * | 1/2008 | Colgrove ............................... 1/1 |
| 7,913,315 | B2 | * | 3/2011 | Ishizaka et al. .................... 726/33 |
| 2003/0138100 | A1 | * | 7/2003 | Ishizaka et al. ................ 380/201 |
| 2004/0073948 | A1 | * | 4/2004 | Ishibashi ........................ 725/134 |
| 2004/0215920 | A1 | | 10/2004 | Haas et al. |
| 2005/0149751 | A1 | | 7/2005 | Ochi et al. |
| 2006/0117013 | A1 | | 6/2006 | Wada |
| 2007/0014397 | A1 | | 1/2007 | Ukeda et al. |
| 2007/0180534 | A1 | * | 8/2007 | Ishizaka et al. .................. 726/26 |

FOREIGN PATENT DOCUMENTS

| JP | 2004-326772 | 11/2004 |
| JP | 2005-122414 | 5/2005 |
| JP | 2005-174180 | 6/2005 |

(Continued)

OTHER PUBLICATIONS

International Search Report for corresponding application No. PCT/JP2009/000522 mailed Mar. 10, 2009.

*Primary Examiner* — Oscar Louie
(74) *Attorney, Agent, or Firm* — Renner, Otto, Boisselle & Sklar, LLP

(57) ABSTRACT

In a memory controller according to the present invention, an external I/F unit receives ID information associated with data from the outside of a non-volatile memory, and a recording controller manages a recording position of the data in the non-volatile memory based on the ID information, so that an amount of time necessary for the retrieval of rights information based on the ID information is reduced.

9 Claims, 26 Drawing Sheets

FOREIGN PATENT DOCUMENTS

| | | |
|---|---|---|
| JP | 2006-065503 | 3/2006 |
| JP | 2006-178930 | 7/2006 |
| JP | 2007-018120 | 1/2007 |
| JP | 2007-018121 | 1/2007 |

\* cited by examiner

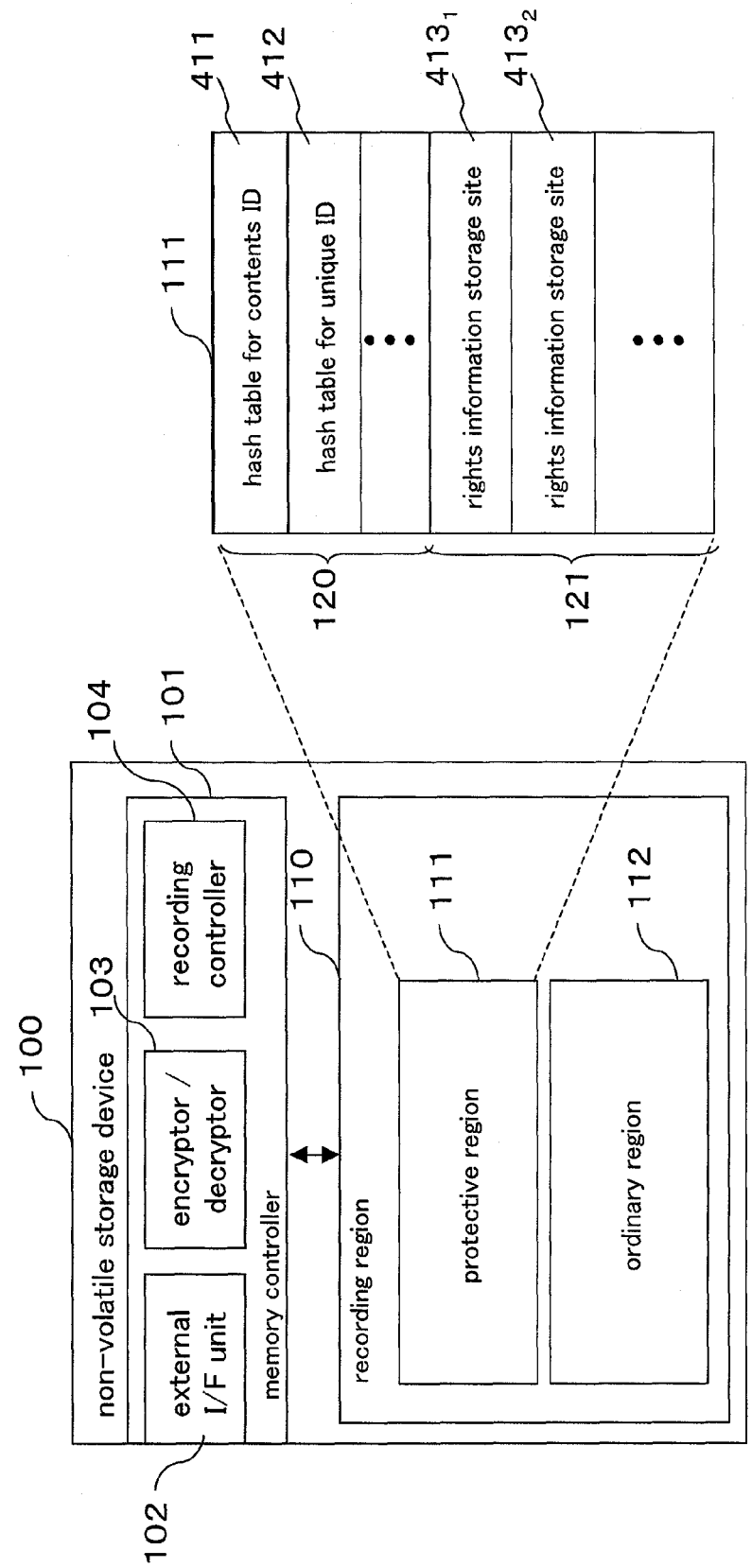
F I G. 1

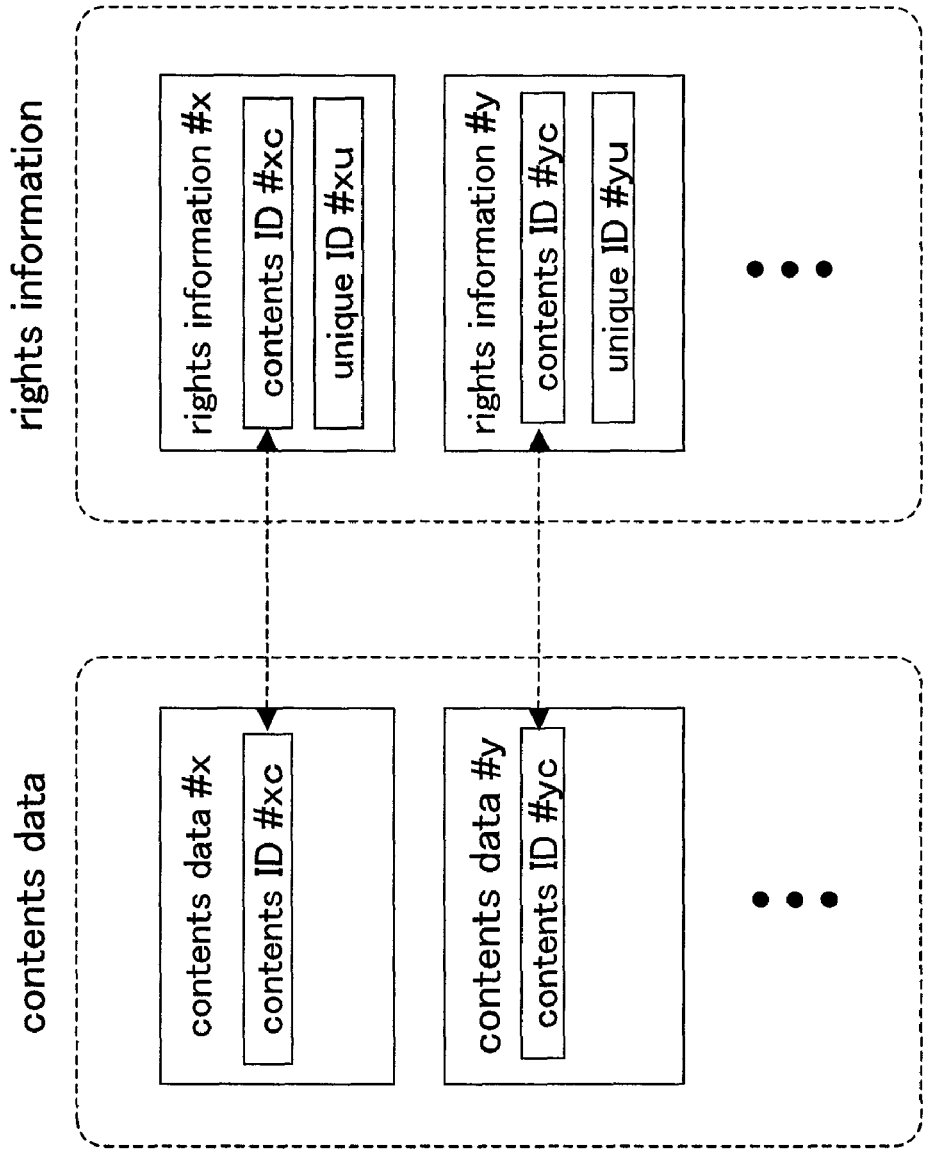
F I G. 2

F I G. 1 6
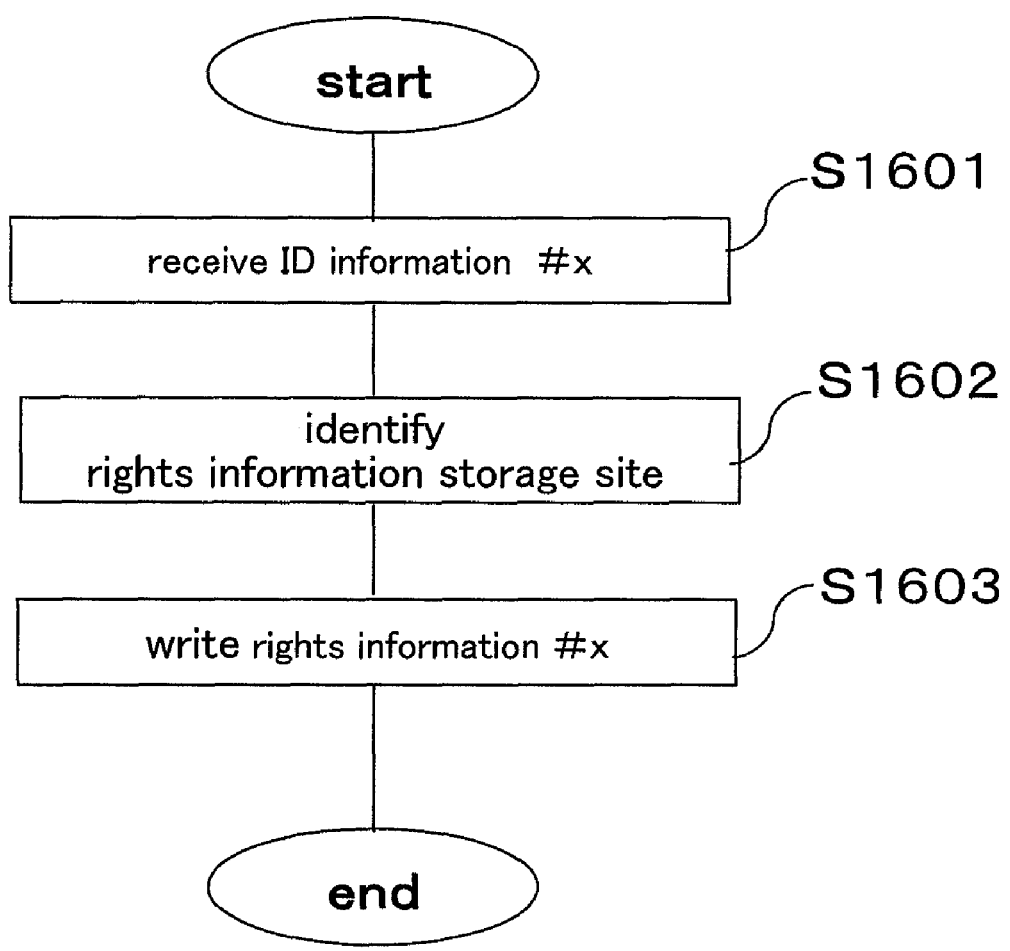

F I G. 2 4
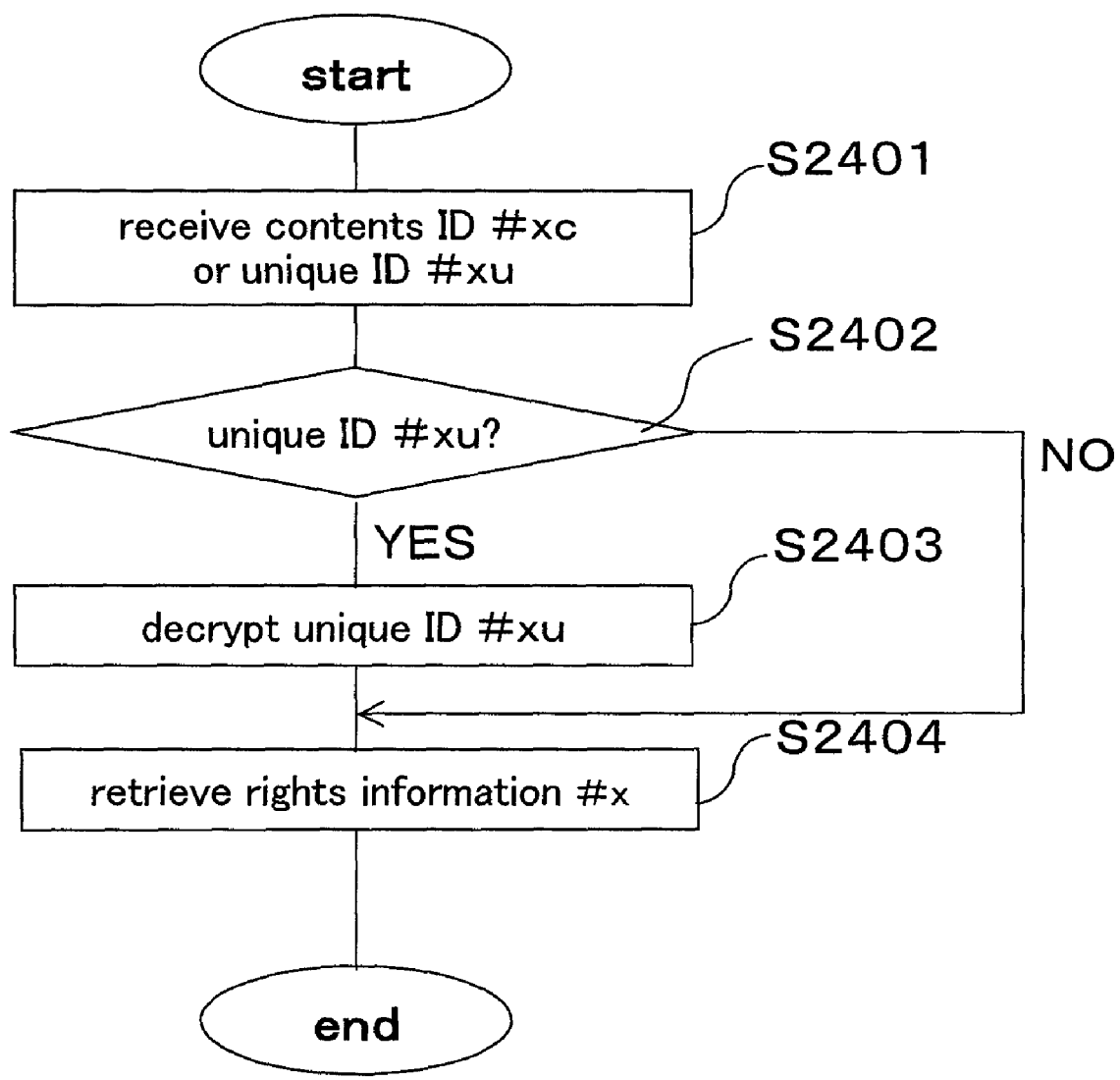

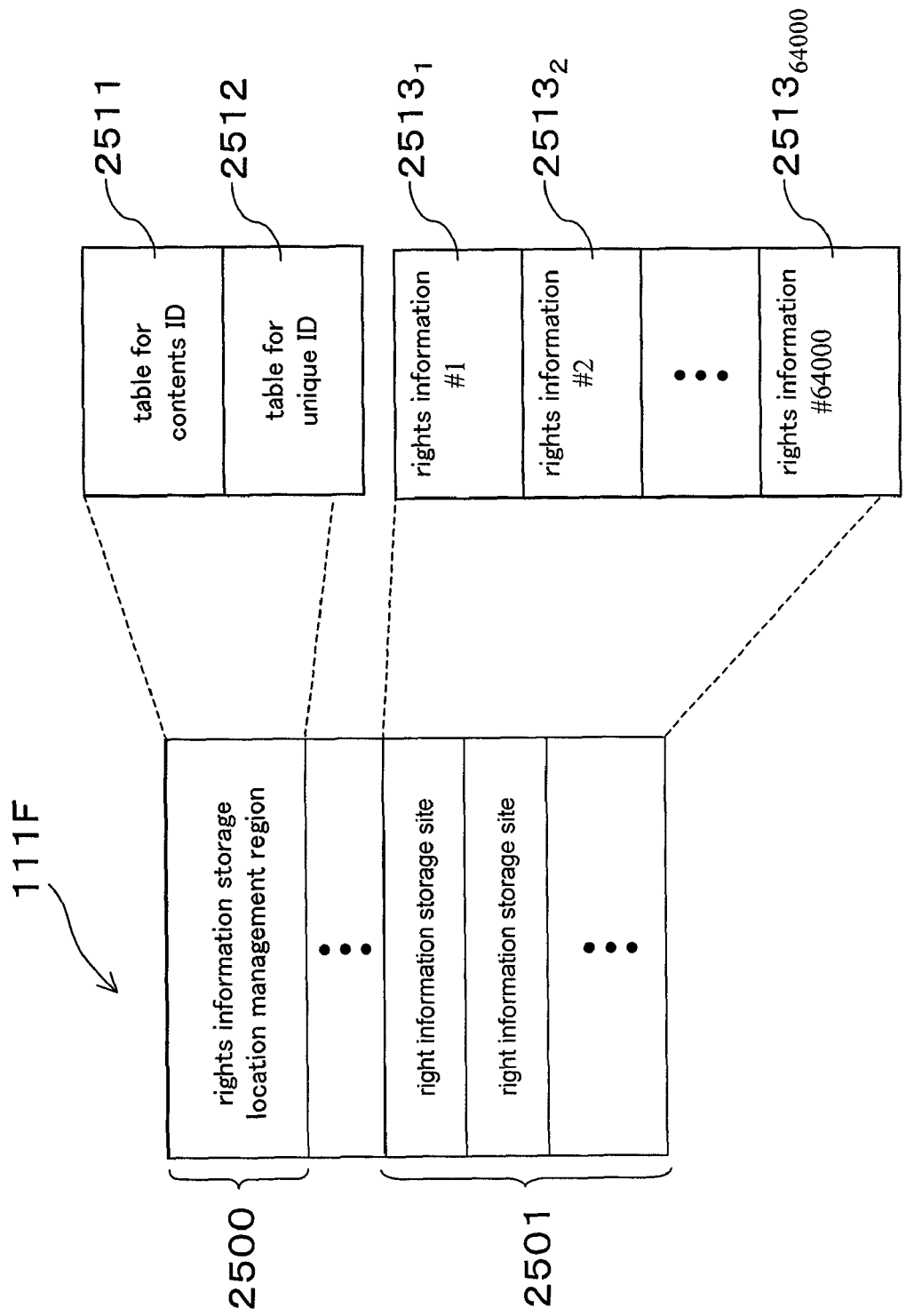

MEMORY CONTROLLER, NONVOLATILE STORAGE SYSTEM, AND DATA MANAGEMENT METHOD

FIELD OF THE INVENTION

The present invention relates to a non-volatile storage device for recording copyrighted digital data, a memory controller in the non-volatile storage device, an access device, a non-volatile storage system, and a data management method.

BACKGROUND OF THE INVENTION

There are such devices currently widespread that can handle various types of digital data such as music contents, moving image contents and still image contents (hereinafter, referred to as contents data) irrespective of whether they are paid or charge-free contents. These devices are used in the following ways: a user voluntarily rips the contents data from a music CD which he/she purchased so as to put it in a PC, records the ripped contents data in the PC on a semiconductor recording medium, and enjoys the contents data played on a compact semiconductor player; or a user, after paying a predetermined rate, downloads into a PC or any other terminal like a mobile phone contents data, such as music, moving images and books provided from a contents provider by way of the Internet or a mobile telephone network, then records the downloaded contents on a semiconductor recording medium and enjoys the contents data played on a compact semiconductor player.

These contents data are in most cases protected by a copyright protection system when the data is distributed through a distribution channel or managed by devices so that any illegal duplication of the data can be prevented from happening. For example, the content data is encrypted according to a certain method, and a key used in the encryption is delivered/retained securely as rights information of the contents data as well as its usage-restriction information of the contents data. In general, such a technology for controlling/restricting the usage and duplication of the contents data is called digital rights management (hereinafter, referred to as DRM technique). The technique includes, for example, specifications which are installed in recording media such as DVD, BD and SD memory cards, and specifications run on a personal computer by application software such as Media Player (registered trademark) and iTunes (registered trademark). In an example of a contents data management method actualized by the DRM technique, each of the encrypted contents data and the rights information corresponding thereto respectively includes ID information which can be uniquely identified and managed, and the contents data is retrieved based on the rights information corresponding to the contents data and the ID information of the contents data corresponding to the rights information.

There are a variety of other recording media on which digital data can be recorded other than the semiconductor recording medium described earlier, examples of which are magnetic discs, optical discs, and magneto-optic discs. Of these media, a semiconductor recording medium is compact and light, and has been rapidly improved in recent years in terms of capacity, speed and price reduction. Therefore, semiconductor recording media are used in various electronic devices such as digital cameras, mobile telephones, mobile music players, television receivers and DVD/BD recorders. Typical examples of the semiconductor recording media are SD memory cards, SDHC memory cards, memory stick (registered trademark) and compact flash (registered trademark). Such semiconductor recording media provided with a copyright protection function as SD memory cards and SDHC memory cards are particularly used in a number of different devices.

An example of the DRM technique used when encrypted contents data and the rights information corresponding thereto are stored in a semiconductor recording medium is given below. According to this technique, the semiconductor recording medium is provided with a protected region which can be accessed only after the recording medium and an access device, which is a reproducer or a recorder, mutually verify that they are authentic, and an normal region which can be accessed without the verification of the authenticity therebetween. Then, the rights information is stored in the protected region, while the encrypted contents data is stored in the normal region.

One of the DRM techniques is a management method wherein the stored contents data and the rights information are associated with each other for management purpose based on the ID information retained by each. In this technique, internal operations of the access device (reproducer) performed when the contents data stored in the semiconductor recording medium is utilized are supposed to be To read contents data to be reproduced from the semiconductor recording medium; and To read the rights information corresponding thereto from the protected region of the semiconductor recording medium based on the ID information which uniquely identifies the rights information.

The rights information is read (obtained) in different manners depending on how the rights information is stored in the protected region. For example, the rights information is stored as a file on a structure managed by a file system such as FAT in the protected region, the rights information and related information in the protected region are recognized and obtained through the use of a file system on the access-device side, and required information is retrieved out of the obtained information by the access device based on the ID information. According to the method, since it is necessary to handle the rights information which is highly confidential inside the access device, the access device needs to be provided with a confidentiality function (such a function that can prevent reverse engineering (for example, tamper resistance)). Moreover, it is necessary to retrieve the rights information at a high speed in order to speedily process (for example, reproduce) the contents data, and the retrieving speed depends on functions of the access device.

As another approach for reading (obtaining) the rights information, the semiconductor recording medium receives the ID information, and the semiconductor recording medium per se efficiently manages and retrieves the rights information stored therein. An example of the approach, which is a method relating to an IC card, is disclosed in the Patent Document 1, wherein a method of efficiently managing internal data by reducing a volume of memory consumption is disclosed.

Patent Document 1: 2005-122414 of the Japanese Patent Applications Laid-Open

DISCLOSURE OF THE INVENTION

Problem to be Solved by the Invention

The conventional technology described so far, however, is disadvantageous in that the retrieval of the rights information takes a relatively long time. The ID information provided to retrieve the rights information stored in the recording medium is often encrypted so that it cannot be illegally used or altered, which is a factor making the retrieval even more time-consuming. According to some of the DRM techniques, the rights information are associated with several pieces of ID information instead of a single piece of ID information, which is another factor making the retrieval even more time-consuming.

Therefore, in order to solve the foregoing problem, a main object of the present invention is to reduce an amount of time necessary for retrieving desired rights information based on the ID information.

Means for Solving the Problem

A memory controller according to the present invention is a memory controller connected to a non-volatile memory for writing data and ID information associated with the data in the non-volatile memory and reading the data and the ID information from the non-volatile memory based on an access instruction supplied from the outside of the non-volatile memory, the memory controller comprising:

an external I/F unit for receiving the ID information associated with the data from the outside of the non-volatile memory; and a recording controller for managing a recording position of the data in the non-volatile memory based on the ID information.

According to the constitution, since the recording controller manages a recording position of the data in the non-volatile memory based on the ID information, an amount of time necessary for retrieving the data (rights information or the like) can be reduced.

According to a mode of the present invention, the ID information received from the outside of the non-volatile memory is encrypted, and the memory controller comprises a decryptor for decrypting the encrypted ID information and supplying the decrypted ID information to the recording controller.

According to the constitution, the amount of time necessary for retrieving the data (rights information or the like) can be reduced without problems even if ID information is encrypted.

According to another mode of the present invention, a plurality of pieces of the ID information are provided, and the recording controller manages the recording position of the data in the non-volatile memory based on one or more pieces of the ID information.

According to the constitution, the amount of time necessary for retrieving the data (rights information or the like) can be reduced without problems even if there are a plurality of pieces of ID information.

Effect of the Invention

According to the present invention, the amount of time necessary for retrieving the data (rights information or the like) based on the ID information can be reduced, and further, the amount of time necessary for retrieving the data (rights information or the like) based on the encrypted ID information can also be reduced. Moreover, the present invention can appropriately reduce the amount of time necessary for retrieving the data (rights information or the like) even when many pieces of ID information are provided.

BRIEF DESCRIPTION OF THE DRAWINGS

FIG. 1 is an illustration of a constitution of a non-volatile storage device according to a preferred embodiment 1 of the present invention.

FIG. 2 is an illustration of a correspondence constitution between contents data and rights information according to the preferred embodiment 1.

FIG. 16 is a flow chart of processing by an access device (playback) according to the preferred embodiment 3.

FIG. 24 is a flow chart of processing by an access device (playback) according to the preferred embodiment 5.

FIG. 25 is an illustration of a constitution of rights information according to a preferred embodiment 6 of the present invention.

Figure 3:
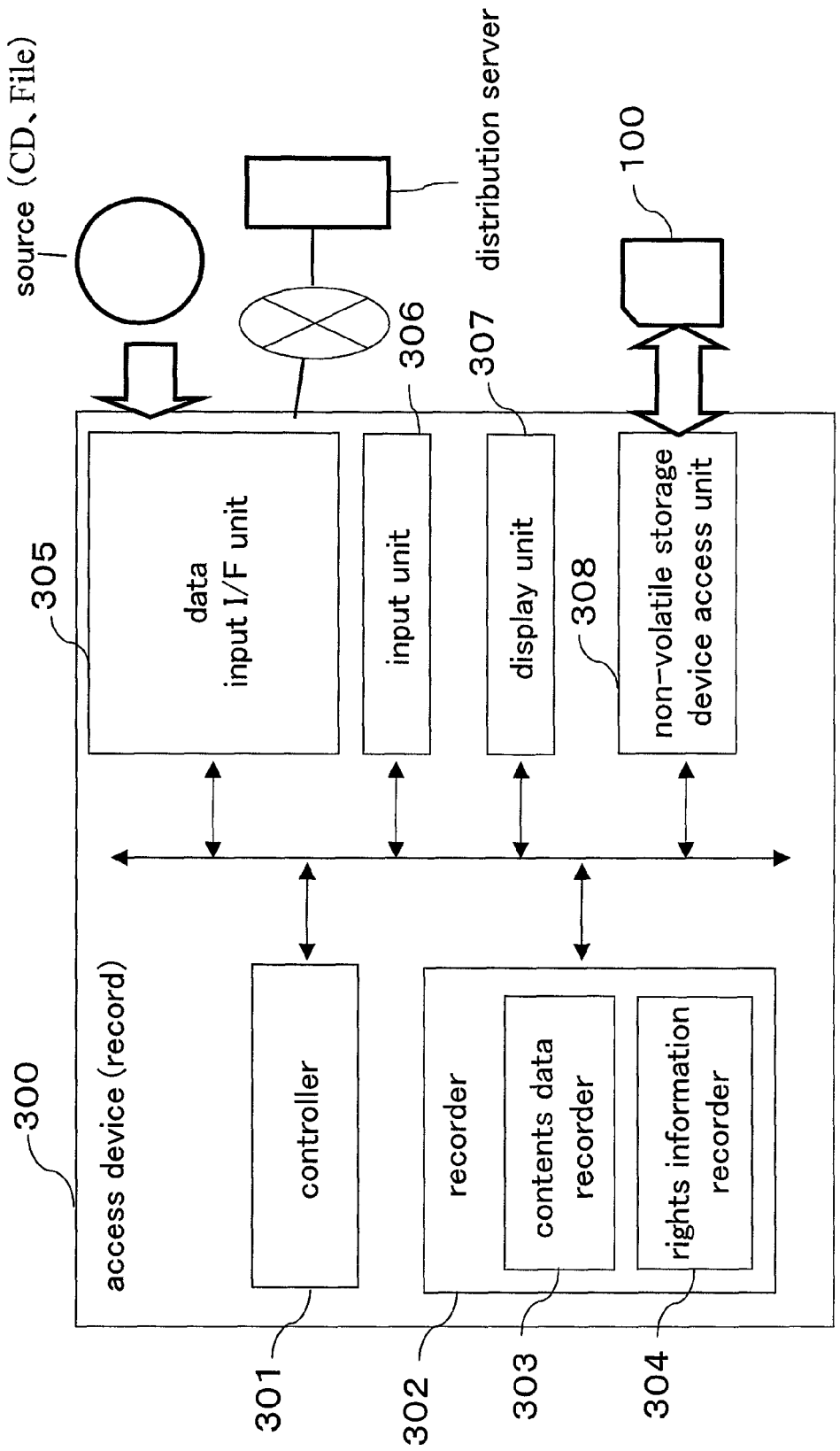
FIG. 3 is an illustration of a constitution of an access device (recording) according to the preferred embodiment 1.

DESCRIPTION OF THE REFERENCE SYMBOLS 100 non-volatile storage device
101 memory controller
102 external I/F unit
103 encryptor/decryptor
104 recording controller
110 recording region
111 protected region
111B protected region 111C protected region
111D protected region
111E protected region
111F protected region
112 normal region
120 rights information storage location management region
121 rights information storage region
1211B$_{1,2}$, ... rights information storage sites
122A$_{1,2}$, ...
122B$_{1,2}$, ... rights information storage site groups
300 access device (recording)
301 controller
302 recorder
303 contents data recorder
304 rights information recorder
305 data input I/F unit
306 input unit
307 display unit
308 non-volatile storage device access unit
411 hash table for contents ID
411$_{a1\text{-}64000}$ data storage sites
412 hash table for unique ID
412$_{1\text{-}64000}$ data storage sites
413$_{1\text{-}64000}$ rights information storage sites
413B$_{1\text{-}64000}$ rights information storage sites
413C$_{1,2}$, ... rights information storage sites
700 access device (playback)
701 output unit
702 reproducer
705 rights information obtaining unit
706 contents retriever
707 controller
708 display unit
709 non-volatile storage device access unit
1711 sort table
1711a$_{1\text{-}64000}$ data storage sites
1712 sort table
1712a$_{1\text{-}64000}$ data storage sites
1713$_{1\text{-}64000}$ rights information storage sites
1720 rights information storage location management region
1721 rights information storage region
2201 rights information storage region
22131$_{1,2}$, ... rights information storage sites
2500 rights information storage location management region
2501 rights information storage region
2511 table for contents ID
2512 table for unique ID

PREFERRED EMBODIMENTS OF THE PRESENT INVENTION

Preferred Embodiment 1

First, examples of constitutions of contents data and rights information corresponding thereto, which are respectively illustrated in a preferred embodiment 1 of the present invention, are described referring to FIG. 2. FIG. 2 is an illustration of examples of constitutions of contents data and rights information stored in a non-volatile storage device 100. The contents data is data in which digital data such as music data or video data is encrypted with a contents key. The rights information is information including the contents key used to encrypt the contents data and usage-restriction information of the contents data. The contents data includes contents ID. The rights information includes such principal information as contents key, MOVE information and time-limit information (not shown in FIG. 2), and further includes ID information. The ID information includes the contents ID and unique ID. The contents ID is an ID used to associate the contents data with the rights information. The unique ID is an ID used to uniquely identify each piece of the rights information. The rights information must be retained and supervised securely. Therefore, it is necessary to take further actions to ensure the confidentiality of data when, for example, the data is updated. The unique ID is used to further authenticate the rights information when, for example, the data is updated by uniquely identifying each piece of the rights information. The contents data and the rights information share one contents ID. More specifically, contents data #x and rights information #x share a contents ID #xc, and contents data #y and rights information #y share a contents ID #yc as illustrated in FIG. 2. Further, the rights information #x retains a unique ID #xu for uniquely identifying the rights information #x, while the rights information #y retains a unique ID #yu for uniquely identifying the rights information #y. The contents ID and the unique ID are information including characters and numerals of, for example, 1,024 bytes at most. In the example illustrated in FIG. 2, the contents data and the contents ID, or the rights information, contents ID and unique ID are included in each data file and stored therein. However, another possible structure is such that these data and information are separately managed as different data and information in a device or a recording medium where these data and information are stored and controlled. The ID information in the present preferred embodiment described below is so constituted that the unique ID alone is encrypted, while the contents ID is not encrypted, which is applied to other preferred embodiments that follow.

Next, the preferred embodiment 1 is described in detail referring to the drawings. FIG. 1 is an illustration of a constitution of the non-volatile storage device 100 which writes and reads data with respect to an access device 300.

The non-volatile storage device 100 is an information recording medium (semiconductor recording medium or the like) or an information recording device, comprising a memory controller 101 and a recording region 110. The memory controller 101 is responsible for internal controls of the non-volatile storage device 100, and comprises an external I/F unit 102, an encryptor/decryptor 103, and a recording controller 104.

The memory controller 101 notifies the access device (reproducer, recorder or the like) 300 of control results thereby obtained by way of the external I/F unit 102, if necessary. Further, the memory controller 101 and the access device 300 mutually verify that they are authentic devices.

The external I/F unit 102 receives and delivers various types of information with respect to the access device 300. The encryptor/decryptor 103 executes computations for the encryption, decryption and the like. The recording controller 104 controls the read and write of various types of data with respect to the recording region 110. A non-volatile memory, such as a flash memory, constitutes the recording region 110, and the recording region 110 comprises a protected region 111 and an normal region 112. In the recording region 110, digital data is recorded. The protected region 111 is a region which can be used only when the access device 300 and the non-volatile storage device 100 mutually verify their authenticity. Therefore, only the access device 300 proved to be authentic is allowed to store and read the data with respect to the protected region 111. FIG. 1 illustrates an example of the protected region 111, in which the protected region 111 comprises a rights information storage location management region 120 and a rights information storage region 121.

The rights information storage region 121 is provided with a plurality of rights information storage sites $413_{1\text{-}64000}$, and rights information #1-#64000 can be stored in the rights information storage sites $413_{1\text{-}64000}$. The rights information #1-#64000 includes information of keys used for the encryption of the contents data #1-#64000, usage-restriction information, contents information, and the like. The normal region 112 is a region where the digital data is arbitrarily written and read by the access device 300, and it is unnecessary for the access device 300 and the non-volatile storage device 100 to authenticate each other in order for the access device 300 to read and write the digital data therein.

The rights information storage location management region 120 comprises a hash table 411 for contents ID and a hash table 412 for unique ID. In the hash table 411 for contents ID and the hash table 412 for unique ID, information which identifies the positions of the rights information storage sites $413_{1\text{-}64000}$ in the rights information storage region 121 is stored. In the present preferred embodiment, each of the rights information #1-#64000 and each of the contents data #1-#64000 are uniquely associated with each other. Therefore, location identifying information which identifies the positions of the rights information storage sites $413_{1\text{-}64000}$, where the rights information #1-#64000 corresponding to contents IDs #1c-#64000c is stored, is stored in the hash table 411, while location identifying information which identifies the positions of the rights information storage sites $413_{1\text{-}64000}$, where the rights information #1-#64000 corresponding to unique IDs #1u-#64000u is stored, is stored in the hash table 412.

Though not shown in the drawings, the normal region 112 is a region managed by a FAT file system, in which FAT file system management information and digital data are stored. The access device 300 reads FAT file system management information of the normal region 112, and reads the digital data stored therein based on the read information. Further, the access device 300 updates the FAT file system management information whenever it writes the digital data in the normal region 112.

Next, a constitution of the access device 300 for recording (hereinafter, referred to as access device (recording) 300) is described referring to FIG. 3. FIG. 3 illustrates a constitution of the access device (recording) 300 which obtains the contents data from CD, DVD, files and the like without accessing networks and also obtains the contents data through various networks such as the Internet and mobile telephone networks, and then records the obtained contents data in the non-volatile storage device 100. Examples of the access device (recording) 300 are PC, mobile telephones, PDA, portable devices, TV and the like.

The access device (recording) 300 comprises a data input I/F unit 305, an input unit 306, a display unit 307, a non-volatile storage device access unit 308, a recorder 302 and a controller 301. The data input I/F unit 305 has the function of reading the contents data from CD, DVD, files and the like, and the function of receiving the contents data and the rights information appended thereto from contents distribution servers comprising various network I/Fs and connected to networks. The input unit 306 comprises a keyboard and various buttons and has the function of accepting character information and operations inputted by a user. The display unit 307 has the function of displaying character information appended to contents data such as meta information on a screen or the like. The non-volatile storage device access unit 308 has such a structure that the non-volatile storage device 100 is loaded therein, and has the function of accessing the loaded non-volatile storage device 100. The recorder 302 has the function of storing various types of data in the non-volatile recording medium. The recorder 302 comprises a contents data recorder 303 for recording the contents data received by the data input I/F unit 305 in a recording medium such as a semiconductor memory or a magnetic disc (including the non-volatile storage device 100), and a rights information recorder 304 for recording the rights information corresponding to the contents data in the recording medium. The controller 301 controls the recorder 302, data input I/F unit 305, input unit 306, display unit 307, and non-volatile storage device access unit 308, and thereby have the function of executing the following:

processing in which the access device (recording) 300 and a distribution server or the non-volatile storage device 100 authenticate each other;

processing in which the contents data is encoded;

processing in which the contents data is encrypted;

processing in which the rights information corresponding to the contents data is generated;

processing in which the ID information (contents ID, unique ID) is allocated to the contents data and the rights information; and processing in which the contents data and the rights information are associated with the corresponding ID information (contents ID and unique ID) and then managed.

Figure 4:
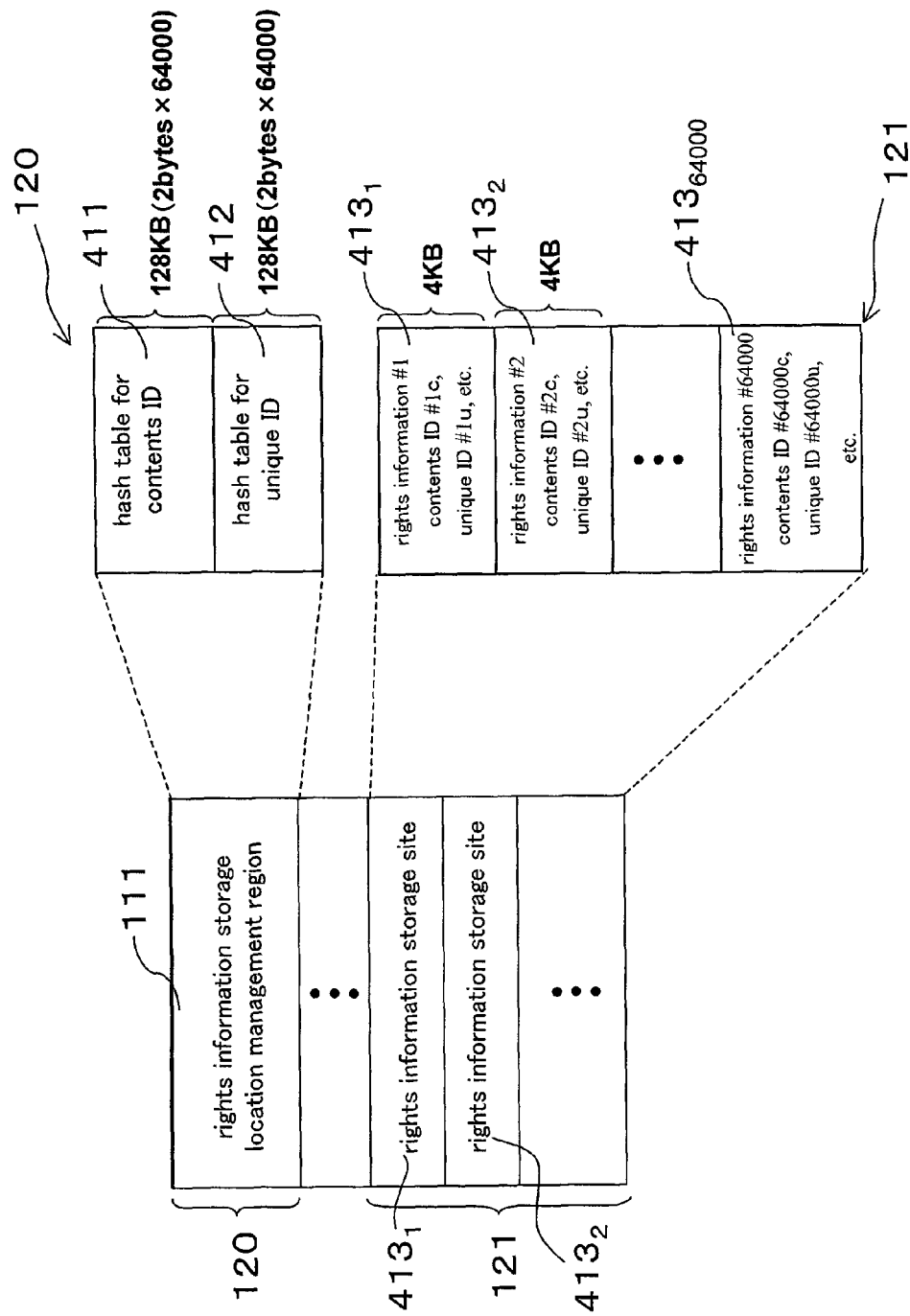
FIG. 4 is an illustration of a constitution of the rights information according to the preferred embodiment 1.

Referring to FIG. 4, a description is given to a constitution of the protected region 111 in the non-volatile storage region 100 used when the access device (recording) 300 illustrated in FIG. 3 stores (records) the rights information illustrated in FIG. 2 in the non-volatile storage device 100 illustrated in FIG. 1. The protected region 111 comprises a rights information storage region 121 and a rights information storage location management region 120. The rights information storage region 121 comprises 64,000 rights information storage sites $413_{1\text{-}64000}$ in total. Each of the rights information storage sites $413_{1\text{-}64000}$ has a 4 k-bytes data capacity, and one piece of rights information #x can be stored in each of the rights information storage sites $413_{1\text{-}64000}$. The rights information storage region 121 has the data capacity of 4×64000=256000 KB, and 64,000 pieces of rights information #1-#64000, at most, can be stored therein.

The rights information storage location management region 120 comprises a hash table 411 for contents ID and a hash table 412 for unique ID. The hash tables 411 and 412 respectively have 64,000 data storage sites $411a_{1\text{-}64000}$ and data storage sites $412a_{1\text{-}64000}$. Each of the data storage sites $411a_{1\text{-}64000}$ and $412a_{1\text{-}64000}$ has a 2-byte capacity, and each of the hash tables 411 and 412 has 2×64000=128K bytes. In the data storage sites $411a_{1\text{-}64000}$, location identifying information which identifies the positions of the rights information storage sites $413_{1\text{-}64000}$ can be stored. Similarly, location identifying information which identifies the positions of the rights information storage sites $413_{1\text{-}64000}$ can be stored in the data storage sties $412a_{1\text{-}64000}$. Location identifying information "X" identifies a rights information storage site $413_x$ at the xth place in the storage order in the rights information storage region 121. The positions of data storage sites $411a_y$ and $412a_z$ in the hash tables 411 and 412 are identified by hash values #xc and #cu. The hash value #xc is obtained when a contents ID #xc constituting an ID information #x is converted into 2 bytes according to the generally called hash function. Similarly, the hash value #xu is obtained when a unique ID #xu constituting the ID information #x is converted into 2 bytes according to the hash function.

Figure 5:
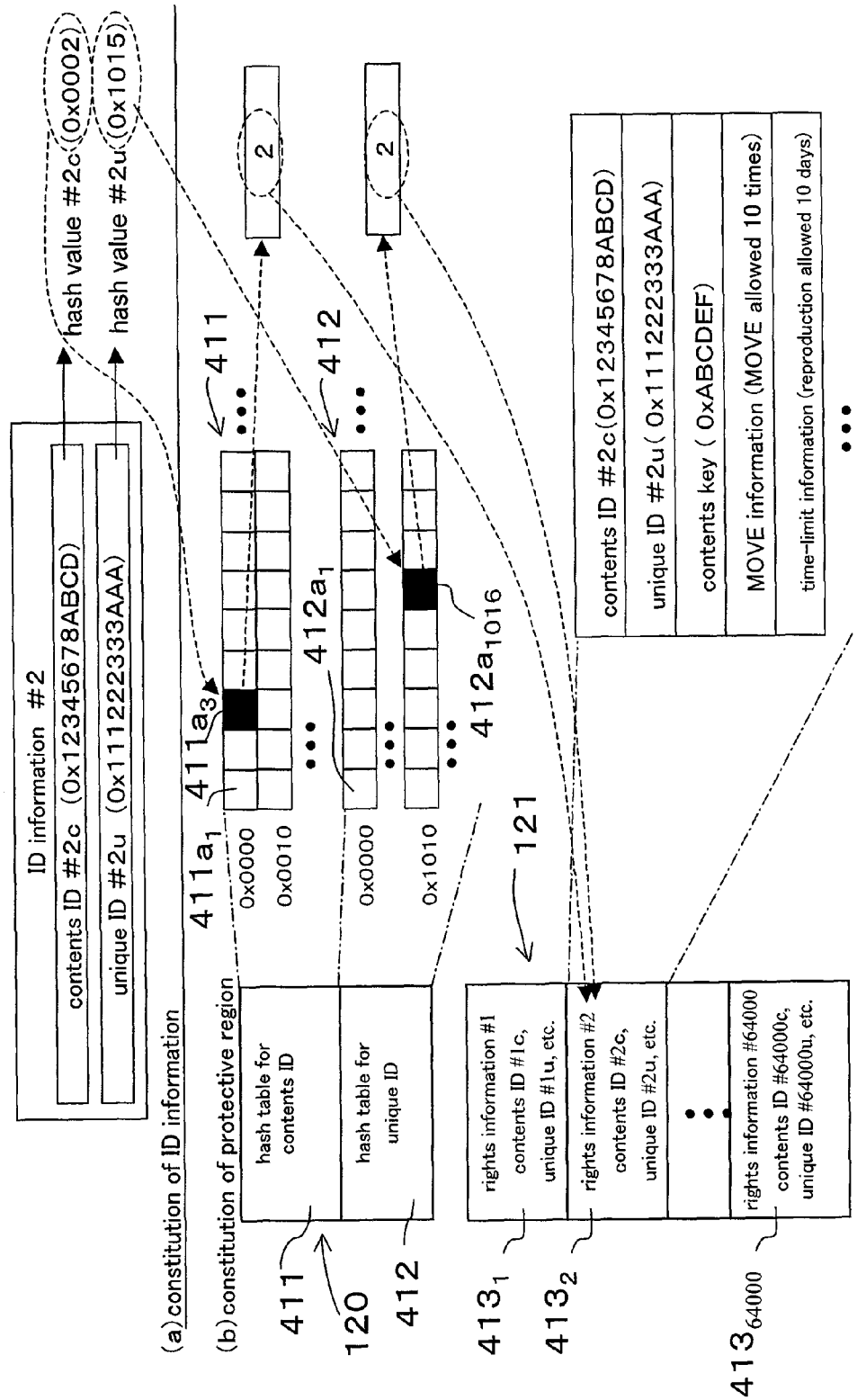
FIG. 5 is a detailed illustration of the constitution of the rights information according to the preferred embodiment 1.

FIG. 5 illustrates a constitution of an ID information #2 which is one of at most 64,000 pieces of the ID information #1-#64000 and a constitution of the protected region 111 corresponding to the ID information #1-#64000 including the ID information #2. FIG. 5 (a) illustrates the exemplified constitution of the ID information #2, while FIG. 5 (b) illustrates the exemplified constitution of the protected region 111 in the non-volatile storage device 100 corresponding to the ID information #2.

The ID information #2 comprises a contents ID #2c and a unique ID #2u. In the drawing, the contents ID #2c is "0x12345678ABCD", while the unique ID #2u is "0x111222333AAA". The hash values #2c and #2u, which were obtained when the contents ID #2c and the unique #2u were converted into 2 bytes according to the hash function, are respectively 0x0002 and 0x1015. The hash value #2c (0x0002) identifies the 0x0002th data storage site $412_3$ in the hash table 411. Similarly, the hash value #2u (0x1015) identifies the 0x1015th data storage site $412_{1016}$ in the hash table 412. In the example illustrated in the drawing, location identifying information "2" is stored in the data storage sites $411a_3$ and $412a_{1016}$ identified by the hash values #2c and #2u. Because the location identifying information "2" is stored, rights information #2 stored in the rights information storage site $413_2$ which is placed second in the storage order in the rights information storage region 121 corresponds to the ID information #2 (contents ID #2c, unique ID #2u).

In the drawing, the rights information #2 includes such right contents as:
 the ID information #2 (contents ID #2c, unique ID #2u) is "0x12345678ABCD", and "0x111222333AAA";
 the contents key is "0xABCDEF";
 the move information is "MOVE allowed 10 times"; and
 the time-limit information is "playback allowed 10 days".

Next, a constitution of the access device for playback (hereinafter, referred to as access device (playback) 700) is described.

The access device (playback) 700 comprises an output unit 701, a reproducer 702, a rights information obtaining unit 705, a contents retriever 706, a controller 707, a display unit 708 and a non-volatile storage device access unit 709.

The reproducer 702 has the function of decrypting encrypted contents data received from the contents retriever 706 using a contents key received from the rights information obtaining unit 705, extend the decrypted data and reproduce the resulting contents data, and comprises a decryptor 704 and a decoder 703. The decryptor 704 decrypts the encrypted contents data using the contents key corresponding thereto. The decoder 703, in the case where the contents data decrypted by the decryptor 704 is compressed, extends the compressed data so that the data can have its original state. In the case where the contents data is not compressed, the decoder 703 is omitted.

The output unit 701 has the function of outputting the contents data decoded by the reproducer 702. In the case where the contents data is audio data, a speaker or the like is used as the reproducer 702. In the case where the contents data is video data or character data, a display or the like is used as the reproducer 702. In the case where the display or the speaker, which is an external device, is connected to the access device (playback) 700 so that the contents data is reproduced, such an output terminal as an AV-OUT is used as the reproducer 702.

The contents retriever 706 has the function of retrieving the contents data in the non-volatile storage device 100. The rights information obtaining unit 705 has the function of, based on the ID information associated with the contents data retrieved by the contents retriever 706, obtaining the rights information corresponding thereto from the non-volatile storage device 100, decrypting the obtained information if it is necessary to do so, judging the rights information, and fetching the contents key.

The controller 707 has the function of controlling the functions of the respective structural components (reproducer 702, rights information obtaining unit 705, contents retriever 706, display unit 708, and non-volatile storage device access unit 709). The display unit 708 has the functions of displaying the information of the contents data read by the contents retriever 706. The non-volatile storage device access unit 709 is configured so that the non-volatile storage device 100 is loaded therein, and has the function of accessing the loaded non-volatile storage device 100.

Figure 6:
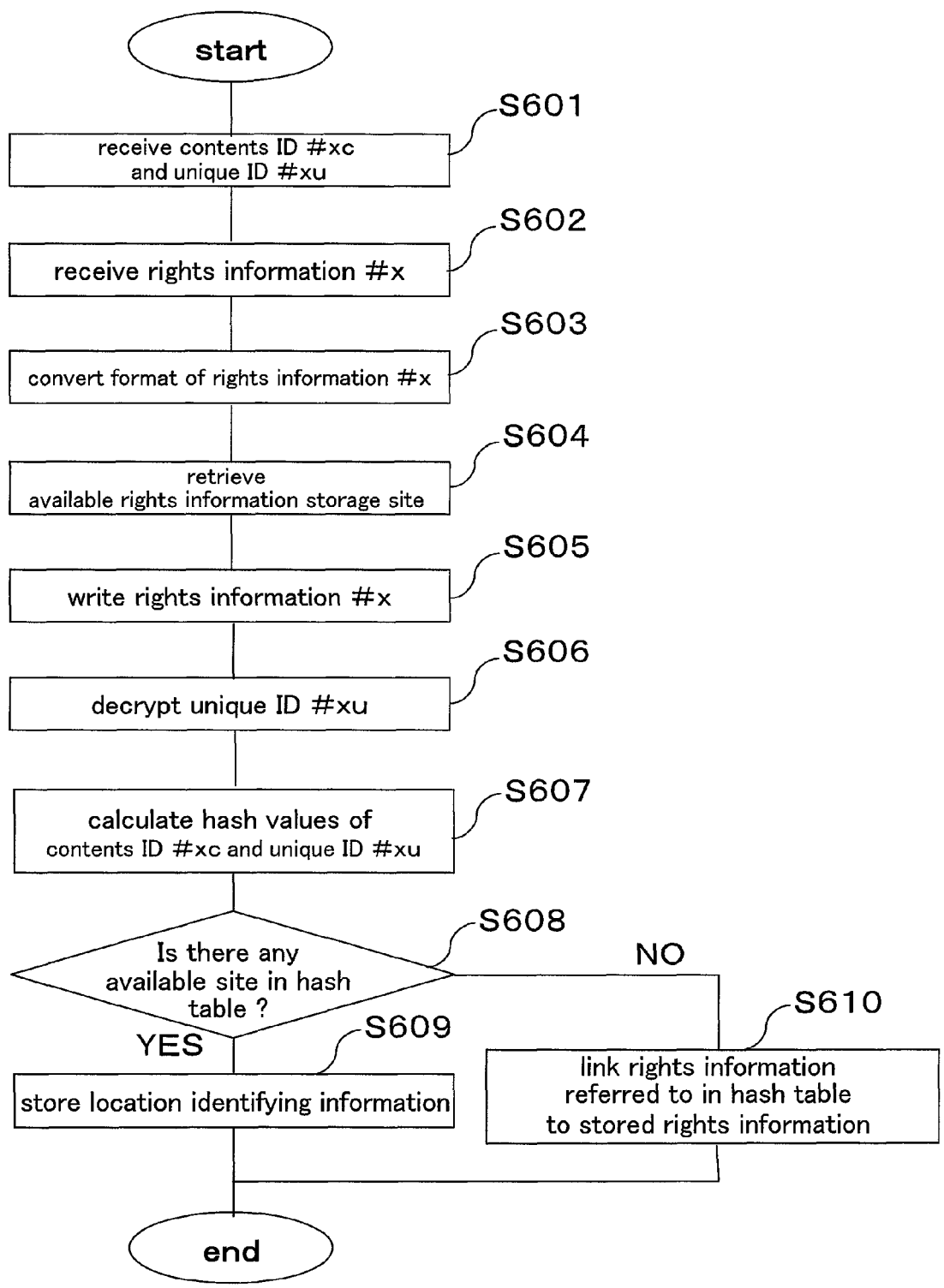
FIG. 6 is a flow chart of processing by the access device (recording) according to the preferred embodiment 1.
Figure 7:
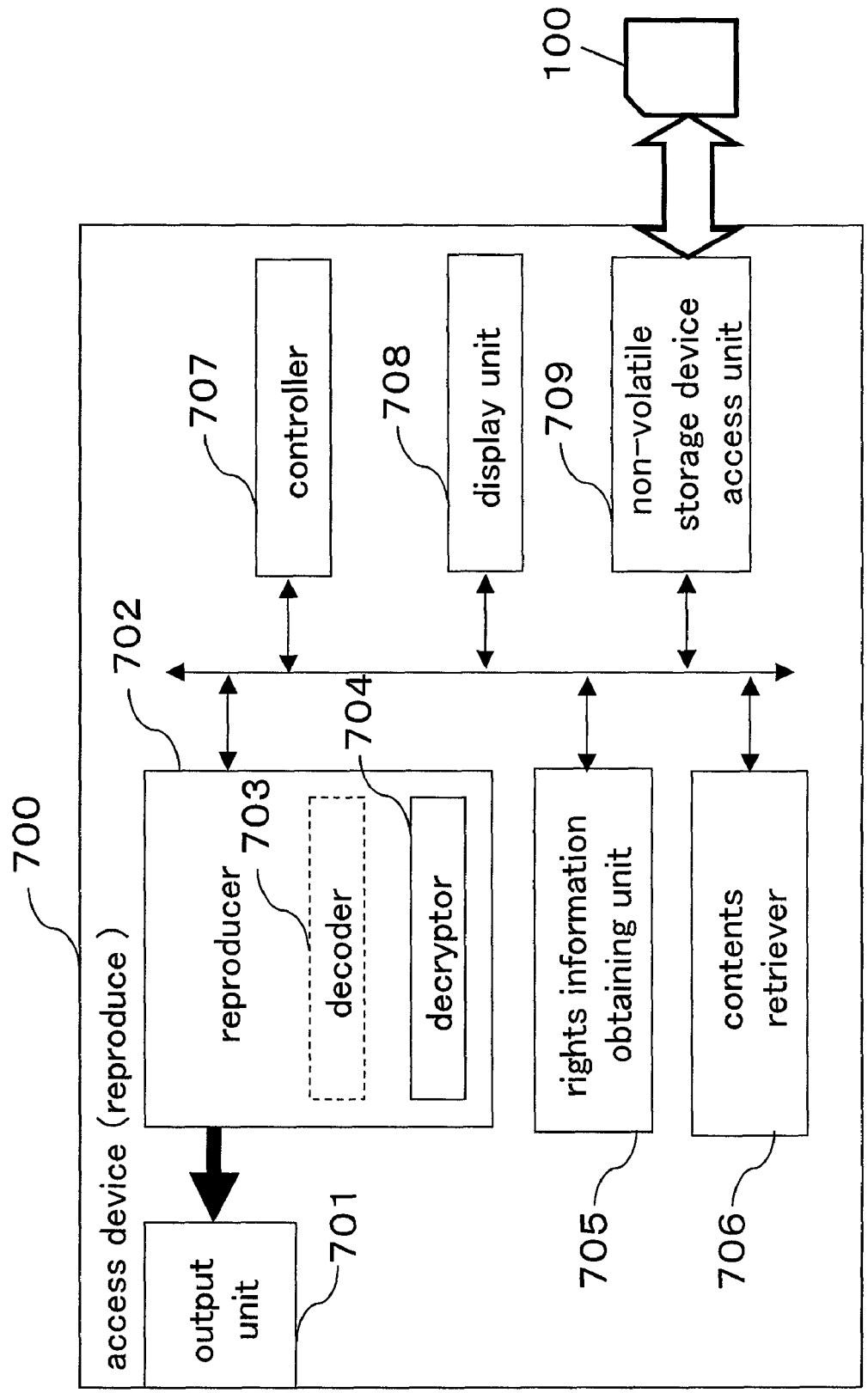
FIG. 7 is an illustration of a constitution of an access device (playback) according to the preferred embodiment 1.

Below is described a processing sequence of the non-volatile storage device 100 performed when the access device (recording) 300 stores (records) the rights information in the non-volatile storage device 100 referring to FIG. 6.

Step S601
First, the recording controller 104 of the memory controller 101 receives the ID information #x (contents ID #xc, unique ID #xu) from the access device (recording) 300 by way of the external I/F unit 102. In the case where the rights information #x is transmitted with the ID information #x (contents ID #xc, unique ID #xu) included therein as illustrated in FIG. 2, the processing of Step S601 is omitted. The ID information #x to be received may be either piece of the ID information #x (contents ID #xc or unique ID #xu). Though not illustrated in the drawing, the access device (recording) 300 and the non-volatile storage device 100 mutually verify that they are authentic as a step prior to Step S601.

Step S602
Next, the recording controller 104 receives the rights information #x corresponding to the ID information #x from the access device (recording) 300 by way of the external I/F unit 102. The rights information #x may be encrypted in the access device (recording) 300 before it is transmitted. In that case, the recoding controller 104 decrypts the rights information (encrypted) #x using the encryptor/decryptor 103, if necessary.

Step S603
Next, the recording controller 104 converts the rights information #x received in Step S602 into data having such a format that can be suitably managed and stored in the protected region 111.

Step S604
Next, the recording controller 104 retrieves a rights information storage site $413_x$, which is available in the rights information storage region 121 of the protected region 111.

Step S605
Next, the recording controller 104 stores the rights information #x converted in Step S603 in the rights information storage site $413_x$, whose availability was confirmed in Step S604.

Step S606
Next, the recording controller 104 decrypts the unique ID #xu received in Step S601 using the encryptor/decryptor 103. As described earlier, the unique ID #xu is the ID information for uniquely identifying the rights information #x.

Step S607
Next, the recording controller 104 calculates the hash values #xc and #xu of the ID information #x (contents ID #xc, unique ID #2xu). As described earlier, such a calculation method that can obtain a 2-byte value is used in the calculation of the hash values #xc and #xu. For example, the hash values #xc and #xu can be calculated in such a manner that the contents ID #xc and the unique ID #2xu are divided on a two-byte basis and subjected to XOR.

Step S608

Next, the recording controller 104 refers to the data storage sites 411$a_y$ and 412$a_z$ of the hash tables 411 and 412 identified by the two hash values #xc and #xu calculated in Step S607 and determines if the location identifying information is already stored in these data storage sites 411$a_y$ and 412$a_z$. As illustrated in FIG. 5, the data storage sites 411$a_y$ and 412$a_z$ referred to in this Step are the data storage sites 411$a_y$ and 412$a_z$ whose positions in the protected region 111 are identified by the hash values #xc and #xu.

Step S609

When it is determined in Step S608 that location identifying information is not stored in the data storage sites 411$a_y$ and 412$a_z$ identified by the hash values #xc and #xu, the recoding controller 104 stores in these data storage sites 411$a_y$ and 412$a_z$ the location identifying information which identifies the position of the data storage site 413$_x$ in which the rights information is stored in Step S605.

Step S610

When it is determined in Step S608 that location identifying information is stored in the data storage sites 411$a_y$ and 412$a_z$ identified by the hash values #xc and #xu, the recoding controller 104, for example, stores the location identifying information (link information) which identifies the position of the data storage site 413$_x$ in which the rights information #x is stored in Step S605 in the existing rights information storage region identified by the hash values #xc and #xu, though not specifically illustrated in the drawing. As a result, the configuration is such that the different rights information can be retrieved according to the same hash value.

Figure 8:
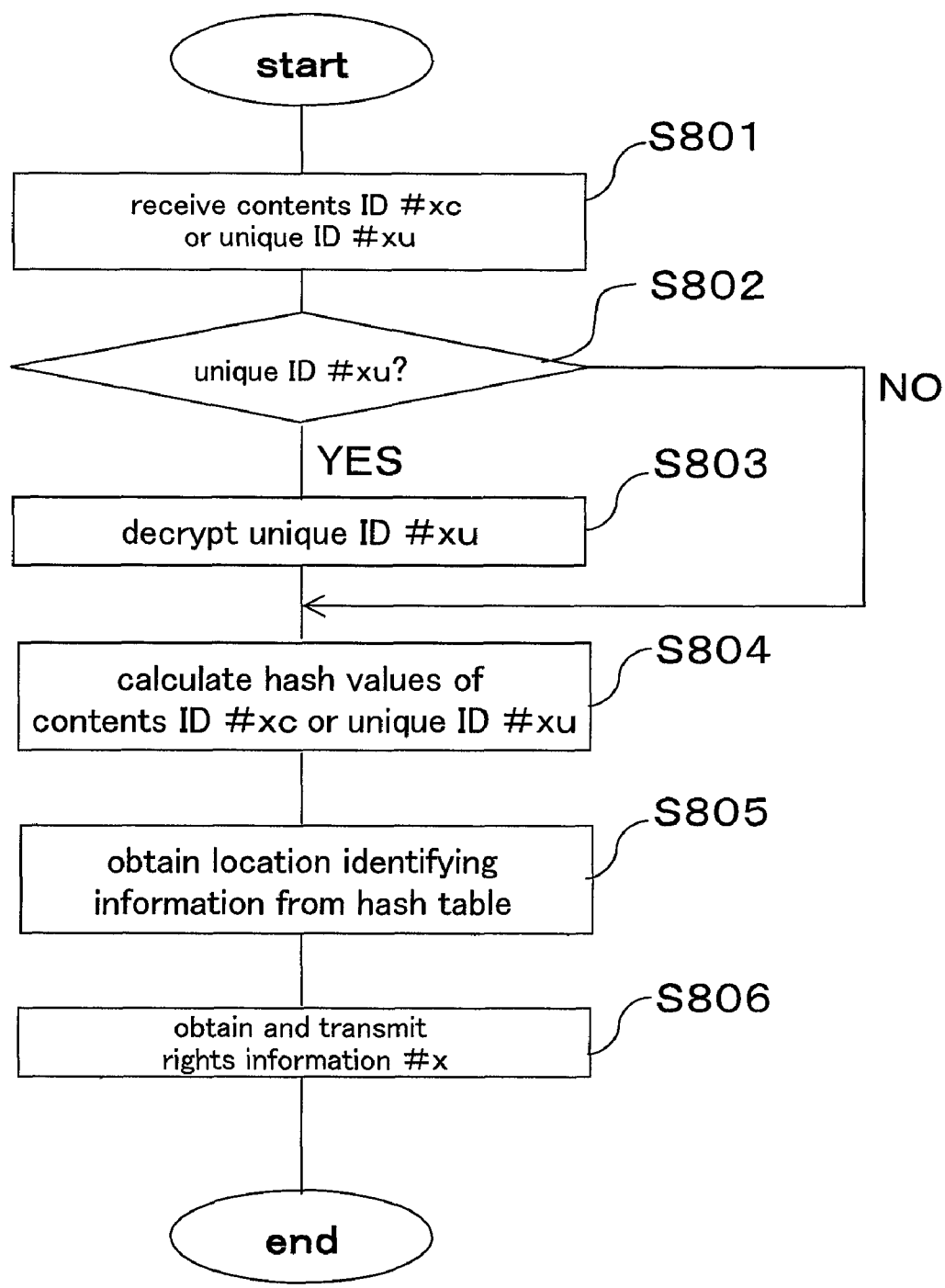
FIG. 8 is a flow chart of processing by the access device (playback) according to the preferred embodiment 1.

Below is described a processing sequence of the non-volatile storage device 100 performed when the access device (playback) 700 reads the rights information from the non-volatile storage device 100, referring to FIG. 8.

Step S801

First, the recording controller 104 of the memory controller 101 receives each piece of the ID information #x (contents ID #xc or unique ID #xu) from the access device (playback) 700 by way of the external I/F unit 101. Though not illustrated in the drawing, the access device (recording) 700 and the non-volatile storage device 100 mutually verify that they are authentic as a step prior to S801.

Step S802

Then, the recording controller 104 determines whether or not the ID information #x received from the access device (playback) 700 is the unique ID #xu.

Step S803

Next, when it is determined in Step S802 that the ID information #x received from the access device (playback) 700 is the unique ID #xu, the recording controller 104 decrypts the unique ID #xu using the encryptor/decryptor 103. When the ID information #x is judged as the contents ID #xc, the recording controller 104 does not implement Step S803.

Step S804

Next, the recording controller 104 calculates the hash value #xc of the contents ID #xc or the hash value #xu of the unique ID #xu received from the access device (playback) 700.

Step S805

Next, the recording controller 104 refers to the hash tables 411 and 412 of the rights information storage location management region 121 of the protected region 111 based on the hash values #xc and #xu calculated in Step S804, and thereby obtains the location identifying information stored in the data storage sites 411$a_y$ and 412$a_z$ whose positions are identified by the hash values #xc and #xu.

Step S806

Next, the recording controller 104 obtains the rights information #x identified by the received ID information #x from the rights information storage site 413$_x$ whose location in the rights information storage region 121 is identified by the location identifying information obtained in Step S805, and transmits the obtained rights information #x to the access device (playback) 700 by way of the external I/F unit 101.

The rights information is thus managed based on the hash values of the ID information in the non-volatile storage device. Accordingly, the rights information can be quickly retrieved by the non-volatile storage device 100. Further, the non-volatile storage device 100, which comprises the encrypting/decrypting feature therein, can directly transmit and receive encrypted ID information and rights information, which assures a high level of security. Further, since the non-volatile storage device 100 per se is capable of speedily retrieving the rights information, the rights information can always be obtained at a high speed without any dependence on the performance of hardware on the access-device side.

In the preferred embodiment 1, the non-volatile storage device which stores and manages the rights information corresponding to a plurality of pieces of ID information; however, the present invention is not necessarily limited to the preferred embodiment thus constituted. The present invention can be modified to such an extent that such modification falls within the spirit and scope of the present invention. For example, the following cases are included in the present invention.

1) In the description of the preferred embodiment described above, the retrieval of the rights information is based on the two IDs (contents ID, unique ID). However, the number of the IDs corresponding to the rights information is not necessarily limited to two. The number of the hash tables in the non-volatile storage device 100 is changed depending on the number of the IDs.

2) In the description of the preferred embodiment described above, as the processing to be executed when the rights information is stored, the link information is added to the rights information referred to before the rights information is stored in the case where the hash values are the same, in other words, the rights information storage location information is already stored in the hash tables. But, the present embodiment is not limited to this method. For example, the non-volatile storage device may be configured to notify the access device (recording) 300 of a value corresponding to an available number of the hash table so as to effectively use available numbers of the hash table.

3) In the example described in the preferred embodiment described above, a two-byte value is obtained as a hash function when the ID information is subjected to XOR; however, the algorithm in the calculation is not particularly limited.

Preferred Embodiment 2

Hereinafter, a preferred embodiment 2 of the present invention is described in detail referring to the drawings. The present preferred embodiment is different to the preferred embodiment 1 in a constitution of the storage of the rights information within the non-volatile storage device 100. Since the rest of the non-volatile storage device 100, access device (recording) 300, and access device (playback) 700 are constituted in the same manner as in the preferred embodiment 1. Therefore, the detailed description of them is omitted.

Figure 9:
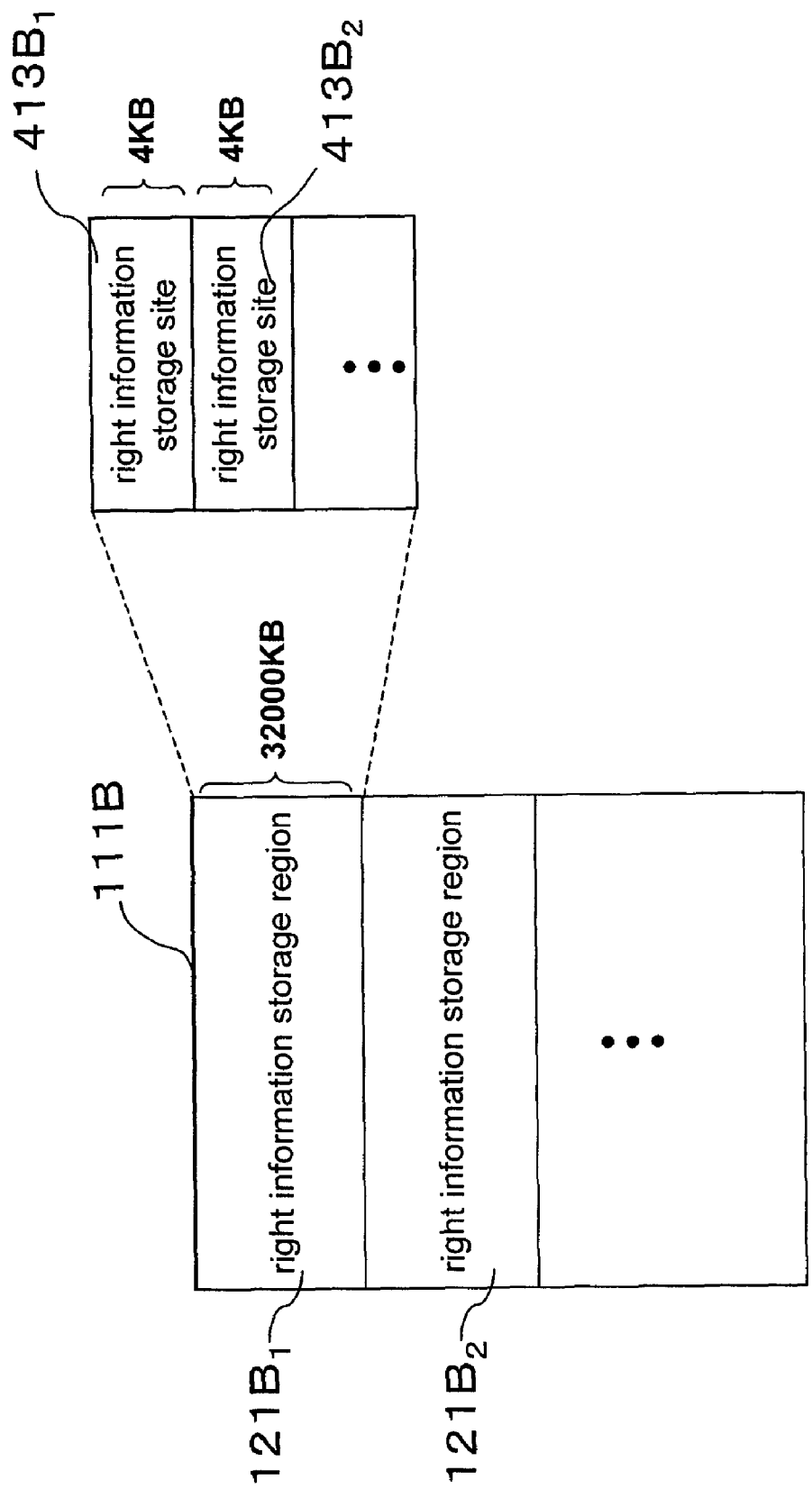
FIG. 9 is an illustration of a constitution of rights information according to a preferred embodiment 2 of the present invention.

FIG. 9 is an illustration of a constitution of a protected region 111B in the non-volatile storage device 100 according to the preferred embodiment 2. The protected region 111B according to the present preferred embodiment is provided with a plurality of rights information storage regions $121B_{1,2,...}$ in place of the rights information storage location management region 120 according to the preferred embodiment 1. Each of the rights information storage regions $121B_{1,2,...}$ has the data length of 32,000 KB as in the case of the rights information storage region 121 according to the preferred embodiment 1. For example, the rights information storage region $121B_1$ is a data region of 32,000 KB in total, from the 1st to the 32,000th KB in the data storage order, the rights information storage region $121B_2$ is a data region of 32,000 KB in total, from the 32,001st to the 64,000th KB in the data storage order, and the rights information storage region $121B_3$ is a data region of 32,000 KB in total, from the 64,001st to the 96,000th KB in the data storage order. The rights information storage regions $121B_{1,2,...}$ are respectively provided with 8,000 rights information storage sites $413B_{1-8000}$. Each of the rights information storage sites $413B_{1-8000}$ is a region having the length of 4 KB where the rights information #x is stored.

Figure 10:
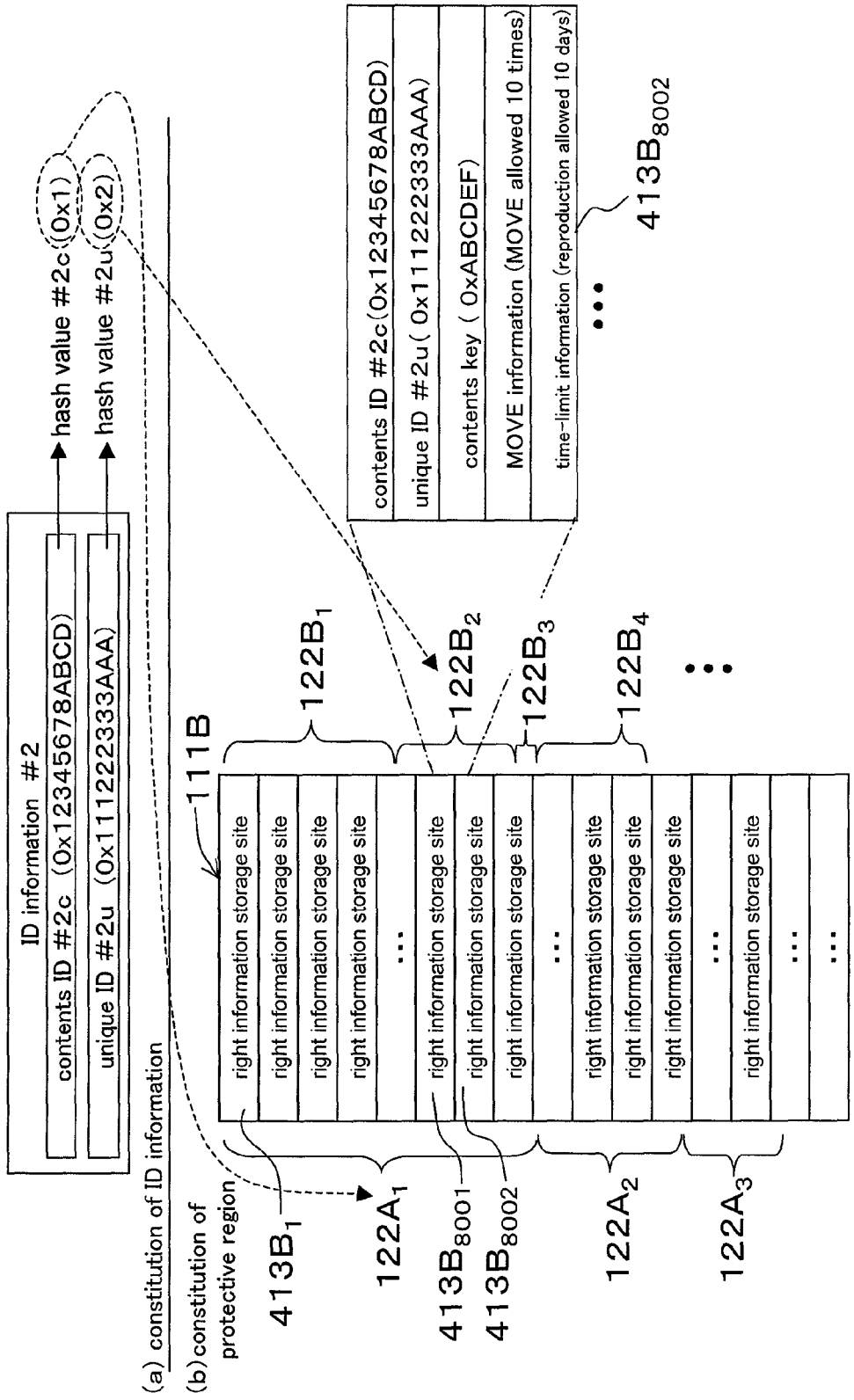
FIG. 10 is a detailed illustration of the constitution of the rights information according to the preferred embodiment 2.

FIG. 10 illustrates a constitution of the ID information #2 which is an example of the rights information #x and a constitution of the protected region 111B corresponding to the ID information #1-#64,000 including the ID information #2. A description is given below referring to the rights information #2 which is the same as in the preferred embodiment 1. FIG. 10 (a) is an exemplified constitution of the ID information #2, while FIG. 10 (b) is an exemplified constitution of the protected region 111B in the non-volatile storage device 100 corresponding to the ID information #2.

The ID information #2 includes a contents ID #2c and a unique ID #2u. In the drawing, the contents ID #2c is "0x12345678ABCD", while the unique ID #2u is "0x111222333AAA". Hash values #2c and #2u, which are obtained when the contents ID #2c and unique ID #2 are converted into two bytes according to the generally called hash function, are respectively 0x1 and 0x2.

The protected region 111B is divided into rights information storage region groups $122A_2, 122A_2 ..., 122B_1, 122B_2...$. In other words, an aggregate of the storage regions $121B_1, 121B_2...$ having the data capacity of 32,000 KB in the protected region 111B constitutes the rights information storage region groups $122A_1, 122A_2, ..., 122B_1, 122B_2...$. In the drawing, by way of example, an aggregate of three rights information storage regions $121B_{x,x+1,x+2}$ (32,000×3=96,000 KB) constitutes storage region groups $122A_1, 121A_2..., $ and an aggregate of one rights information storage region $121B_y$ (32,000×1=32,000 KB) constitutes rights information storage region groups $122B_{1,2}...$. These rights information storage region groups $122A_{1,2}..., 122B_{1,2}...$ correspond to divided regions according to the present invention.

When the protected region 111B is divided and identified according to the hash value #xc (calculated based on the contents ID #xc), one of rights information storage region groups $122A_{1,2,3}...$ is identified by the hash value #xc. When the protected region 111B is divided and identified according to the hash value #xu (calculated based on the unique ID #xu), one of rights information storage region groups $122B_{1,2,3}...$ is identified by the hash value #xu.

The hash value #xc of the contents ID #xc being 0x1 denotes that the rights information corresponding to the contents ID #xc is stored in any of a plurality of rights information storage sites $413_{1-24000}$ included in the rights information storage region group $122A_1$ placed first in the rights information storage region groups $122A_{1,2},...$. The hash value #xc of the unique ID #xu being 0x2 denotes that the rights information corresponding to the unique ID #xu is stored in any of the a plurality of rights information storage sites $413_{8001-16000}$ included in the rights information storage region group $122B_2$ placed second in the rights information storage region groups $122B_{1,2},...$. In the example illustrated in the drawing, the rights information #2 (contents key "0xABCDEF", MOVE information "MOVE allowed ten times", time-limit information "playback allowed 10 days") corresponding to the ID information #2 (contents ID #2c, unique ID #2u) is stored in the rights information storage site $413B_{8002}$, which is one of the rights information storage sites $413B_{8001-16000}$ redundantly included in the rights information storage region group $122A_1$ and the rights information storage region group $122B_2$. Thus, the rights information is stored in the rights information storage site $413B_y$, included in the rights information storage region groups $122A_{1,2},...$ and the rights information storage region groups $122B_{1,2},...$ identified by the hash values #xc and #xu of the ID information #x (contents ID #xc, unique ID #xu).

Figure 11:
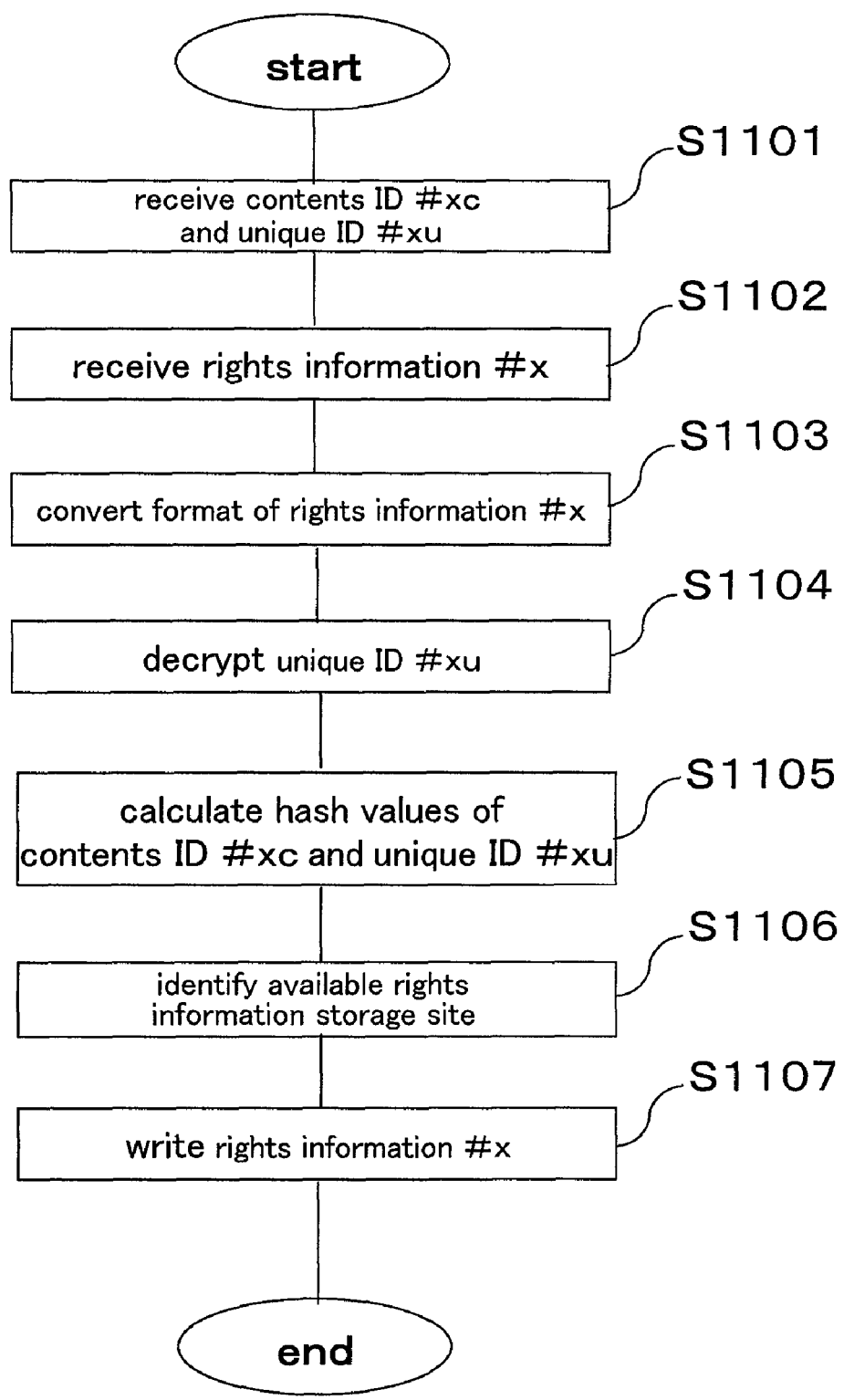
FIG. 11 is a flow chart of processing by an access device (recording) according to the preferred embodiment 2.

Next, an example of a processing sequence of the non-volatile storage device 100 performed when the access device (recording) 300 stores (records) the rights information in the non-volatile storage device 100 is described referring to FIG. 11.

Step S1101

First, the recording controller 104 of the memory controller 101 receives the ID information #x (contents ID #xc, unique ID #xu) by way of the external I/F unit 102. In the case where the ID information #x (contents ID #xc, unique ID #xu) is included in the rights information #x as illustrated in FIG. 2, the processing of Step S601 is omitted. The ID information #x to be received may be either piece of the ID information (contents ID #xc or unique ID #xu). Though not illustrated in the drawing, the access device (recording) 300 and the non-volatile storage device 100 mutually verify that they are authentic as a step prior to this Step.

Step S1102

Next, the recording controller 104 receives the rights information #x associated with the ID information #x from the access device (recording) 300 by way of the external unit I/F unit 102. The rights information #x may be encrypted in the access device (recording) 300 before it is transmitted. In that case, the recording controller 104 decrypts the rights information (encrypted) #x using the encryptor/decryptor 103, if necessary.

Step S1103

Next, the recording controller 104 converts the rights information #x received in Step S1102 into data having such a format that can be suitably managed and stored in the protected region 111B.

Step S1104

Next, the recording controller 104 decrypts the unique ID #xu received in Step S1101 using the encryptor/decryptor 103.

Step S1105

Next, the recording controller 104 calculates the hash values #xc and #xu of the ID information #x (contents ID #xc, unique ID #xu). In the calculation, such a calculation method that the hash values #2c and #2u take values of, for example, "1"-"3", are used.

Step S1106

Next, the recording controller 104 identifies rights information storage region groups $122A_x$ and $122B_y$ in the protected region 111B based on the calculated hash values #xc and #xu, and then, retrieves a rights information storage site $413B_z$ which is not used (which is available) in the rights information storage region groups $122A_x$ and $122B_y$.

Step S1107

Next, the recording controller 104 stores the rights information converted in Step S1103 in the rights information storage site 413B$_z$ whose availability was confirmed in Step S1106.

Figure 12:
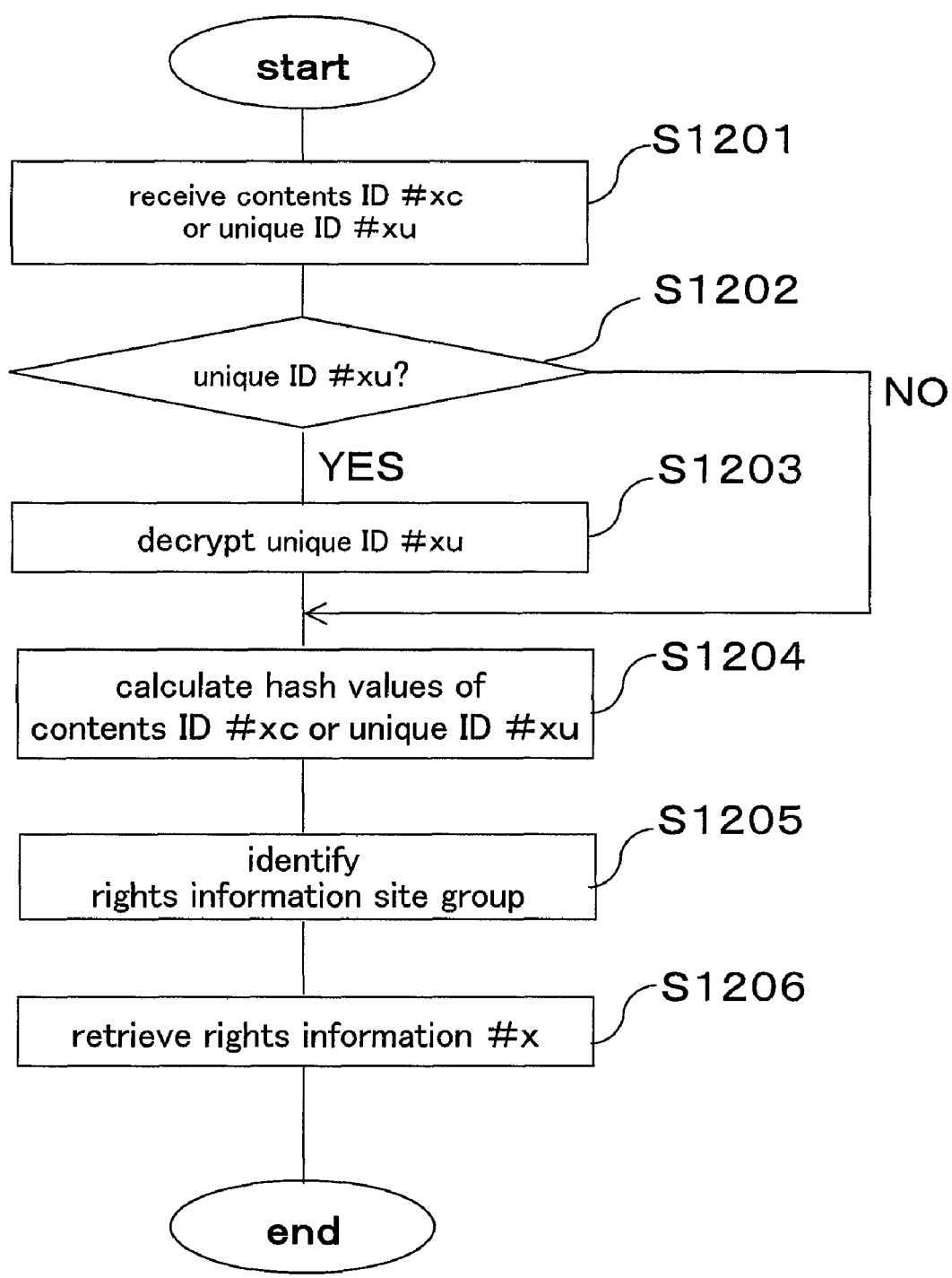
FIG. 12 is a flow chart of processing by an access device (playback) according to the preferred embodiment 2.

Next, an example of a processing sequence of the non-volatile storage device 100 performed when the access device (playback) 700 reads rights information from the non-volatile storage device 100 is described referring to FIG. 12.

Step S1201

First, the recording controller 104 of the memory controller 101 receives either piece of the ID information #x (contents ID #xc or unique ID #xu) from the access device (playback) 700 by way of the external I/F unit 101. Though not illustrated in the drawing, the access device (playback) 700 and the non-volatile storage device 100 mutually verify that they are authentic as a step prior to Step S1201.

Step S1202

Next, the recording controller 104 determines whether or not the ID information #x received from the access device (playback) 700 is the unique ID #xu.

Step S1203

When it is determined in Step S1202 that the ID information #x received from the access device (playback) 700 is the unique ID #xu, the recording controller 104 decrypts the unique ID #xu using the encryptor/decryptor 103. When it is determined that the ID information #x is the contents ID #xc, the recording controller 104 does not implement the processing of Step S1203.

Step S1204

Next, the recording controller 104 calculates the hash value #xc of the contents ID #xc or the hash value #xu of the unique ID #xu received from the access device (playback) 700.

Step S1205

Next, the recording controller 104 determines the rights information storage region groups 122A$_x$ and 122B$_y$ based on the hash values #xc and #xu calculated in Step S1204.

Step S1206

Next, the recording controller 104 retrieves the rights information storage region groups 122A$_x$ and 122B$_y$ determined in Step S1205 based on the ID information #x (contents ID #xc or unique ID #u) calculated in Steps S1201 S1203, and thereby identifies the rights information storage site 413B$_z$ in which the rights information #x corresponding to the ID information #x is stored so as to obtain the rights information #x stored in the identified rights information storage site 413B$_z$.

As described, the rights information #x is dispersion-managed in the non-volatile storage device 100 based on the hash values #xc and #cu of the ID information #x, so that the rights information can be retrieved at a high speed by the non-volatile storage device 100. Further, the non-volatile storage device 100, which comprises the encrypting/decrypting feature therein, can directly transmit and receive the encrypted ID information and rights information, which assures a high level of security. Further, the non-volatile storage device 100 per se has the function of searching the rights information at a high speed, which constantly enables a high-speed search of the rights information without any dependence on the hardware performance on the access-device side.

In the description of the preferred embodiment 2, the case where the non-volatile storage device 100 stores and manages the rights information corresponding to many pieces of ID information was described. However, the present invention is not necessarily limited to the case, and can be modified within the intended spirit and scope thereof. For example, the following cases are included in the present invention.

1) In the preferred embodiment described above, the rights information is retrieved based on two pieces of ID information; however, the number of pieces of ID information based on which the rights information is retrieved may be other than two. In that case, the rights information dispersion method is changed depending on the number of the IDs.

2) In the preferred embodiment described above, the calculation method, in which the ID information is changed into any of the values 1-3 as the hash function, is used; however, the scope of and the calculation method for the hash values are not particularly limited. The scope of possible hash values may be expanded depending on the characteristics of the respective non-volatile storage devices so that the rights information can be more efficiently dispersion-managed. Of the ID information retained by the rights information, the ID information to be used in the dispersion-management may be limited.

Preferred Embodiment 3

Hereinafter, a preferred embodiment 3 of the present invention is described in detail referring to the drawings. The present preferred embodiment is different to the preferred embodiment 1 in a constitution of the storage of the rights information in the non-volatile storage device 100. The rest of the non-volatile storage device 100, access device (recording) 300, and access device (playback) 700 have the same constitutions as in the preferred embodiment 1. Therefore, the detailed description of them is omitted.

Figure 13:
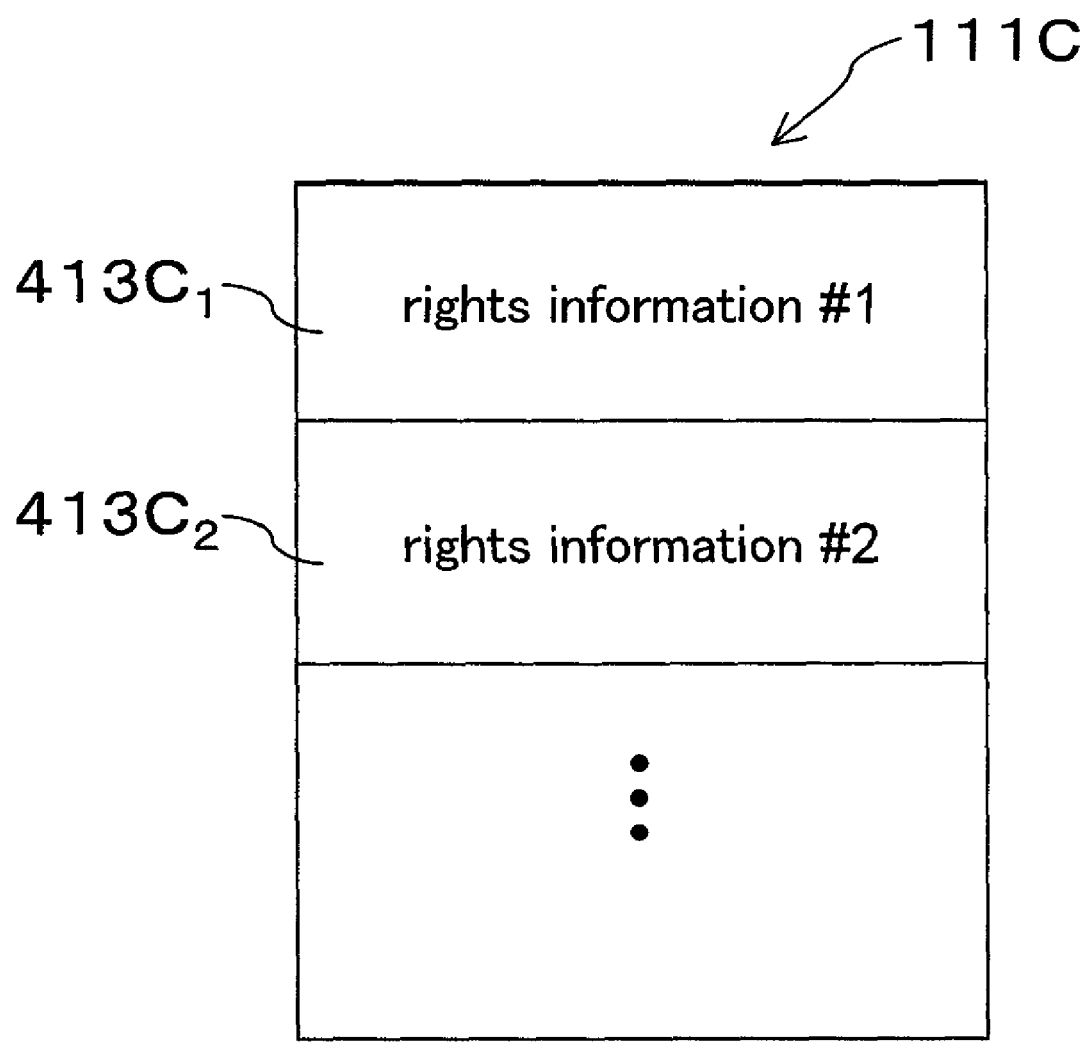
FIG. 13 is an illustration of a constitution of rights information according to a preferred embodiment 3 of the present invention.
Figure 14:
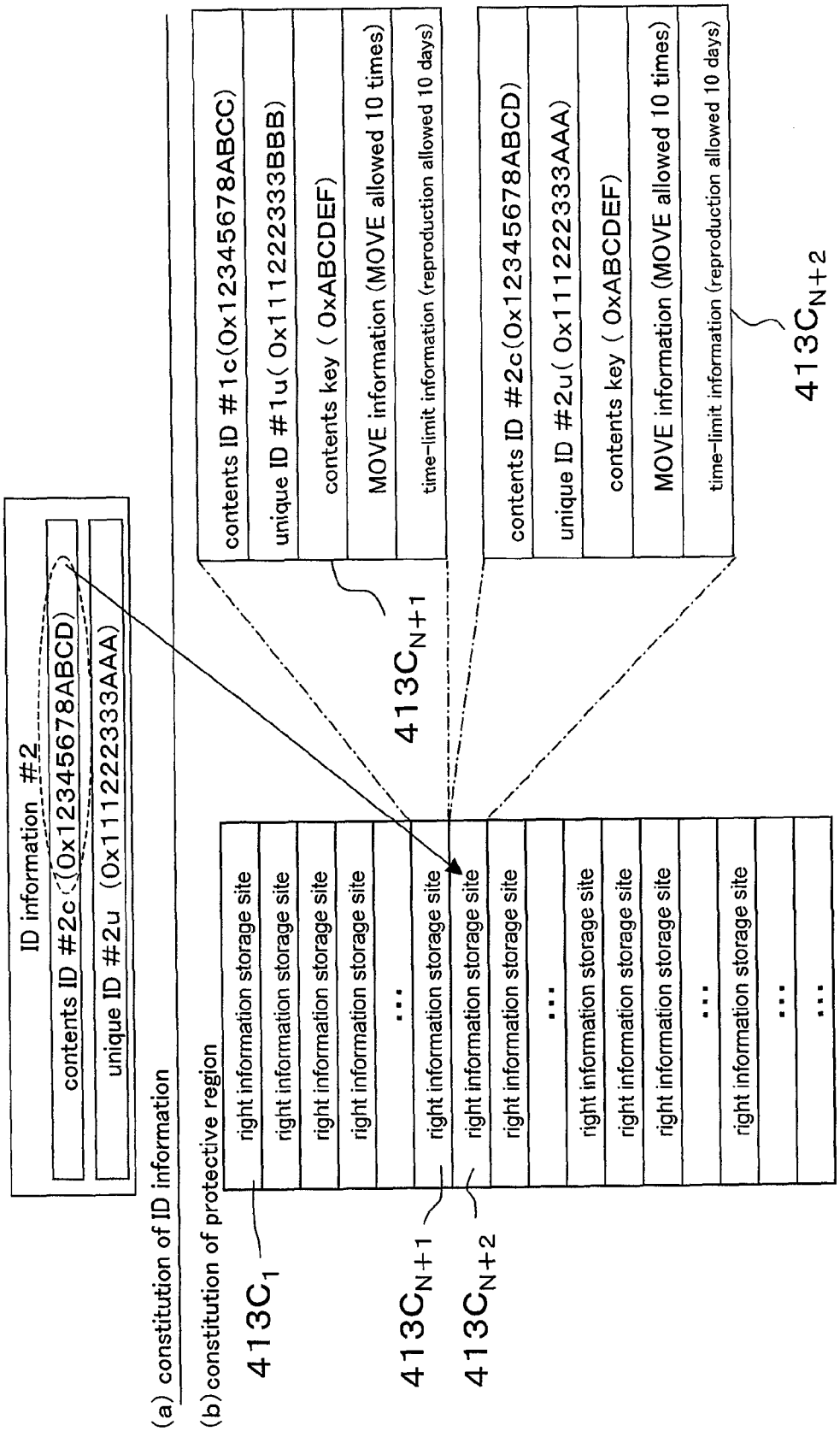
FIG. 14 is a detailed illustration of the constitution of the rights information according to the preferred embodiment 3.

FIG. 13 is an illustration of a constitution of the rights information in the non-volatile storage device 100. A protected region 111C according to the preferred embodiment 3 is not provided with the rights information storage location management region 120 and the rights information storage region 121 according to the preferred embodiment 1. Instead, the rights information #x is stored in the protected region 111C sequentially from head toward end. The rights information #x is stored in rights information storage sites 413C$_{1,2}$, .... FIG. 14 (a) is an illustration of a constitution of the ID information #2, while FIG. 14 (b) is an illustration of a constitution of the protected region 111C in the non-volatile storage device 100 corresponding to the ID information #1-#64,000 including the ID information #2.

The ID information #2 comprises the contents ID #2c and the unique ID #2u. In the drawing, the contents ID #2c is "0x12345678ABCD," and the unique ID #2u is "0x111222333AAA." The protected region 111C comprises a plurality of rights information storage sites 413C$_{1,2}$, .... The rights information #x is sorted in accordance with the contents ID #xc and stored in any of the rights information storage sites 413C$_{1,2}$, .... For example, in the case where the contents ID #2c of the rights information #2 is "0x12345678ABCD" as illustrated in the drawing, the rights information #2 is stored in the rights information storage site 413C$_{n+2}$ placed next to the rights information storage site 413C$_{N+1}$ in which the rights information #1 including "0x12345678ABCC" as the contents ID #1c is stored. In the drawing, the rights information #x is sorted in the ascending order in accordance with the value of the contents ID #x; however, it may be sorted in the descending order.

Figure 15:
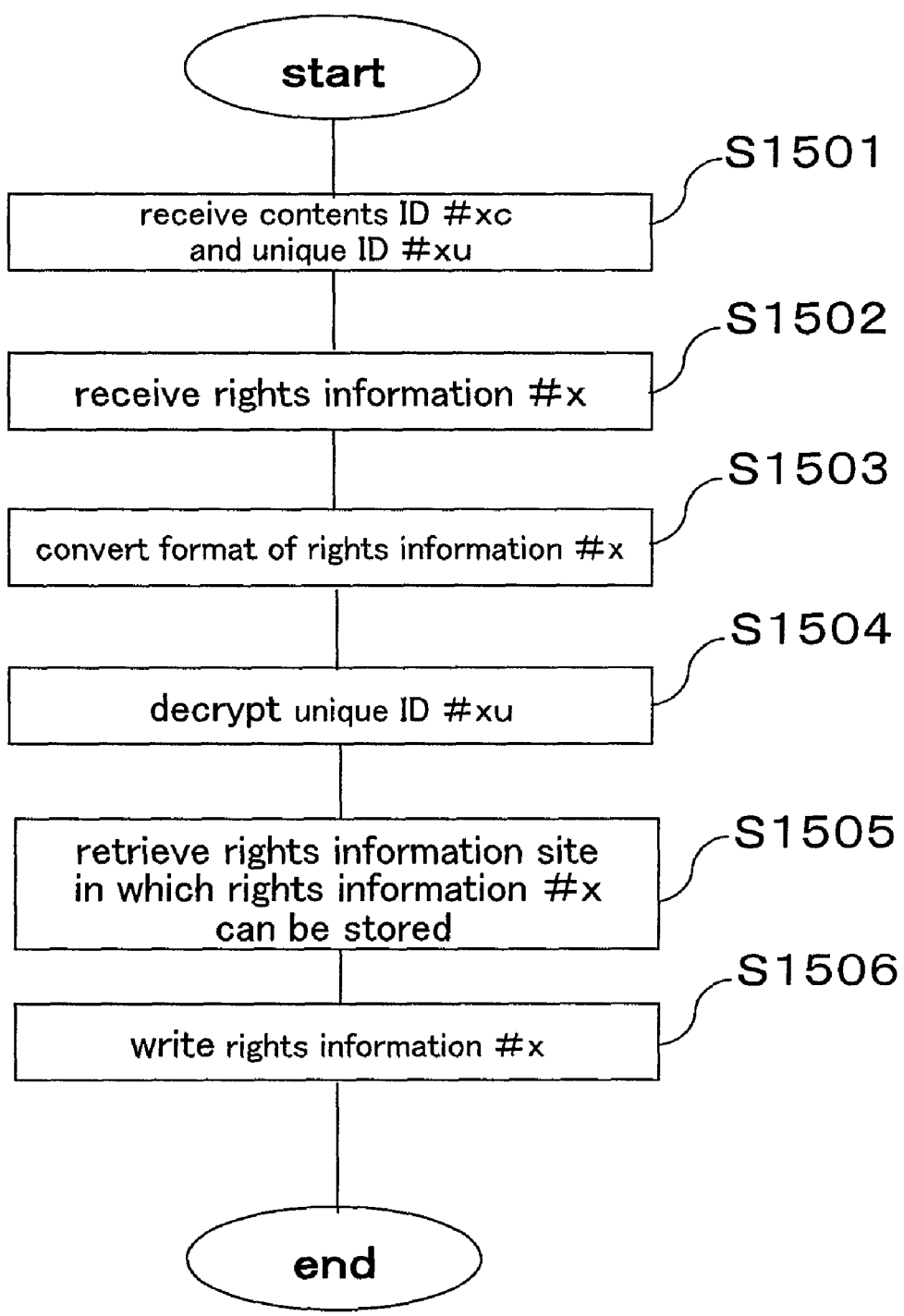
FIG. 15 is a flow chart of processing by an access device (recording) according to the preferred embodiment 3.

Next, an example of a processing sequence of the non-volatile storage device 100 performed when the access device (recording) 300 stores (records) the rights information in the non-volatile storage device 100 is described referring to FIG. 15.

Step S1501

First, the recording controller 104 of the memory controller 101 receives the ID information #x (contents ID #xc or unique ID #xu) by way of the external I/F unit 101. In the case where the rights information #x per se includes the ID information #x (contents ID #xc, unique ID #xu) as illustrated in FIG. 14, the processing of Step S1501 is omitted. The ID information #x to be received may be either piece of the ID information (contents ID #xc or unique ID #xu). Though not illustrated in the drawing, the access device (recording) 300 and the non-volatile storage device 100 mutually verify that they are authentic as a step prior to this Step.

Step S1502

Next, the recording controller 104 receives the rights information #x corresponding to the ID information #x from the access device (recording) 300 by way of the external I/F unit 102. The rights information #x may be encrypted in the access device (recording) 300 before it is transmitted. In that case, the recording controller 104 decrypts the rights information (encrypted) #x using the encryptor/decryptor 103, if necessary.

Step S1503

Next, the recording controller 104 converts the rights information #x received in Step S1502 into data having such a format that can be suitably managed and stored in the protected region 111C.

Step S1504

Next, the recording controller 104 decrypts the unique ID #xu received in Step S1101 using the encryptor/decryptor 103.

Step S1505

Next, the recording controller 104 retrieves the contents IDs #1c, #2c, ... in the rights information stored in the rights information storage sites $413C_{1,2}, \ldots$ of the protected region 111C, and thereby determines which of the rights information storage sites $413C_{1,2}, \ldots$ in the sorting order should be used for the storage of the ID information #x and the rights information #x received in Steps S1501 and S1502. The retrieval and determination in this Step are implemented by means of such a retrieval algorithm as the Quicksort.

Step S1506

Next, the recording controller 104 writes the ID information #x and the rights information #x received in Steps S1501 and S1502 in the rights information storage site $413C_x$ determined in Step S1505. In this description, the ID information #x and the rights information #x are written in the rights information storage site $413C_{N+2}$.

Next, an example of a processing sequence of the non-volatile storage device 100 performed when the access device (playback) 700 reads the rights information from the non-volatile storage device 100 is described referring to FIG. 16.

Step S1601

First, the recording controller 104 of the memory controller 101 receives either piece of the ID information #x (contents ID #xc or unique ID #xu) from the access device (playback) 700 by way of the external I/F unit 101. Though not illustrated in the drawing, the access device (recording) 700 and the non-volatile storage device 100 mutually verify that they are authentic as a step prior to Step S1601.

Step S1602

Next, the recording controller 104 retrieves the rights information storage sites $413C_{1,2}, \ldots$ of the protected region 111 based on the contents ID #xc of the ID information #x received in Step S1601. More specifically, the rights information storage sites $413C_{1,2}, \ldots$ are retrieved according to such a method as the Quicksort in order to identify the rights information storage site $413C_x$ in which the same contents ID #xc as the contents ID #xc received in Step S1601 is stored Step S1603

Next, the recording controller 104 reads the rights information #x from the rights information storage site $413C_x$ identified in Step S1602. In this description, the decryption of the ID information and the rights information in the case where they are encrypted is not illustrated. However, such a decryption process may be included.

When the particular ID information is sorted and managed in the non-volatile storage device as described, the rights information can be retrieved at a higher speed by the non-volatile storage device per se than in a conventional manner where the rights information is simply stored in the order as received, earliest first. This method is especially effective when a certain particular piece of ID information is often used and sorting management is performed based on the particular ID information. Further, the non-volatile storage device 100, which comprises the encrypting/decrypting feature therein, can directly transmit and receive the encrypted ID information and rights information, which assures a high level of security. Further, the non-volatile storage device 100 per se is capable of speedily retrieving the rights information, and the rights information can always be obtained at a high speed without any dependence on the hardware performance on the access-device side.

In the description of the preferred embodiment 3, the non-volatile storage device stores/manages the rights information using the ID information after sorting it; however, the present invention is not necessarily limited to such case. The present invention may be modified within the intended spirit and scope thereof. For example, the following case may be included in the present invention.

1) In the preferred embodiment described above, the rights information is associated with the two pieces of ID information. However, the number of pieces of ID information corresponding to the rights information is not necessarily limited to two.

Preferred Embodiment 4

Hereinafter, a preferred embodiment 4 of the present invention is described in detail referring to the drawings. The present preferred embodiment is different to the preferred embodiment 1 in a constitution of the storage of the rights information in the non-volatile storage device 100. The rest of the non-volatile storage device 100, access device (recording) 300, and access device (playback) 700 have the same constitutions as in the preferred embodiment 1. Therefore, the detailed description of them is omitted.

Figure 17:
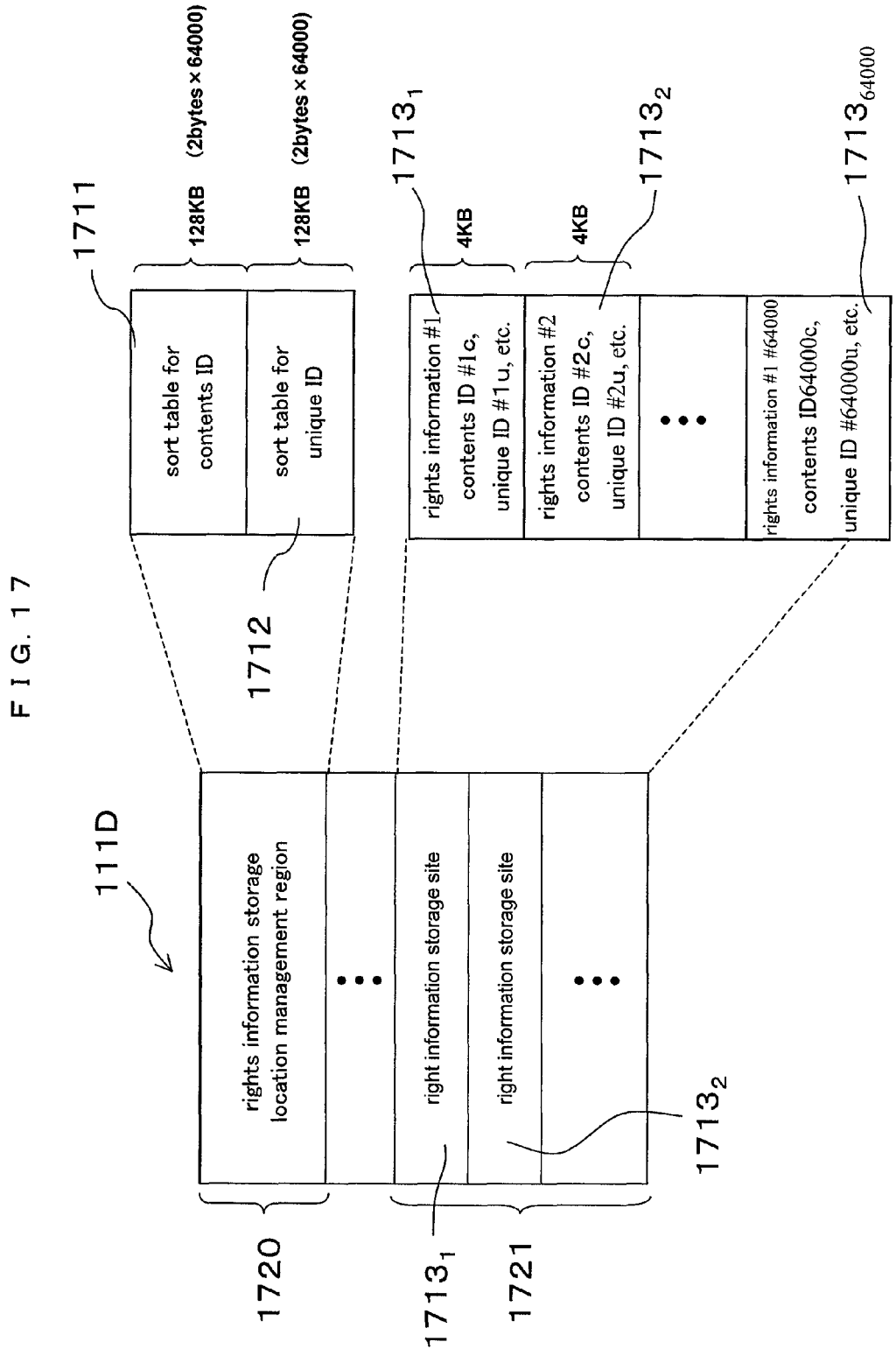
FIG. 17 is an illustration of a constitution of rights information according to a preferred embodiment 4 of the present invention.

FIG. 17 is an illustration of a constitution of a protected region 111D in the non-volatile storage device 100. The protected region 111D is provided with a rights information storage region 1721 and a rights information storage location management region 1720. The rights information storage region 1721 comprises 64,000 rights information storage sites $1713_{1-64000}$ in total. Each of the rights information storage sites $1713_{1-64000}$ has the data capacity of 4K bytes, and one rights information #x can be stored in each of the rights information storage sites $1713_{1-64000}$. The rights information storage region 1721 has the data capacity of 4×64,000=256,000 KB, and can store at most 64,000 pieces of rights information #1-#64,000.

The rights information storage location management region 1720 comprises a sort table 1711 for contents ID and a sort table 1712 for unique ID. Each of the sort tables 1711 and 1712 has 64,000 data storage sites $1711a_{1-64000}$ and 64,000 data storage sites $1712a_{1\text{-}64000}$, respectively (see FIG. 18). Each of the data storage sites $1711a_{1\text{-}64000}$ and $1712a_{1\text{-}64000}$ has the capacity of two bytes, and each of the sort tables 1711 and 1712 has 2×64,000=128K bytes. In the data storage sites $1711a_{1\text{-}64000}$, location identifying information which identifies the positions of rights information storage sites $1713_{1\text{-}64000}$ can be stored. Similarly, location identifying information which identifies the positions of rights information storage sites $1713_{1\text{-}64000}$ can be stored in the data storage sites $1412a_{1\text{-}64000}$.

Figure 18:
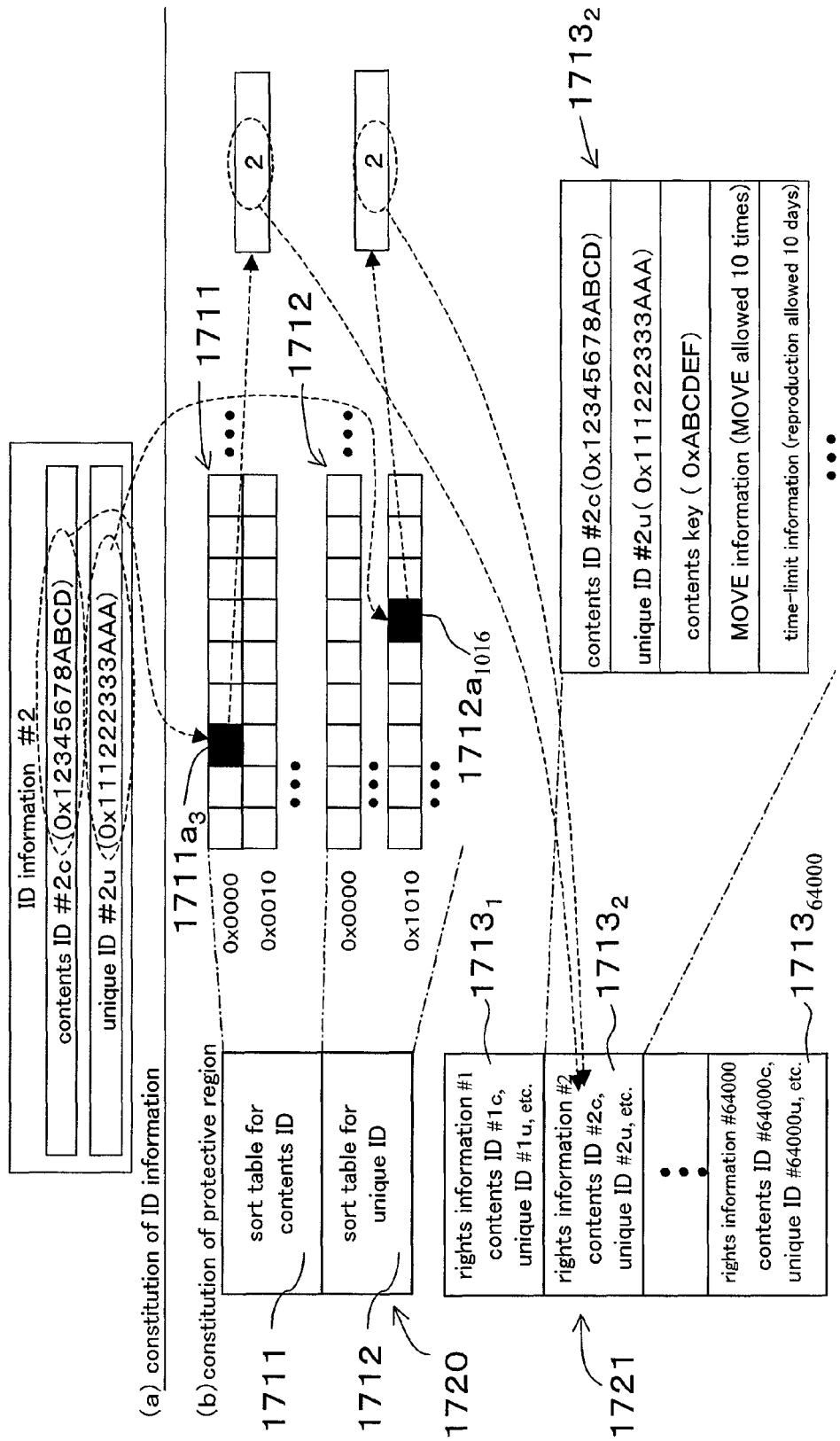
FIG. 18 is a detailed illustration of the constitution of the rights information according to the preferred embodiment 4.

FIG. 18 are illustrations of a constitution of rights information #1-#64000, at most, including rights information #2 which is one of at most 64,000 pieces of rights information #1-#64000, and a constitution of the protected region 111D corresponding thereto. FIG. 18 (a) illustrates the exemplified constitution of ID information #2 corresponding to the rights information #2, while FIG. 18 (b) illustrates the exemplified constitution of the protected region 111D in the non-volatile storage device 100 corresponding to the ID information #2.

The ID information #2 comprises the contents ID #2c and the unique ID #2u. In the drawing, the contents ID #2c is "0x12345678ABCD," and the unique ID #2u is "0x111222333AAA." In data storage sites $1711a_{1\text{-}64000}$ of the sort table 1711 for contents ID, the location identifying information which identifies the storage location of the rights information #x based on the contents ID #xc in the rights information #x is stored after being sorted. The location identifying information is sorted based on the contents ID #xc Similarly, the location identifying information which identifies the storage location of the rights information #x based on the unique ID #xu in the rights information #x is stored, after being sorted, in the data storage sites $1712a_{1\text{-}64000}$ of the sort table 1712 for unique ID. The location identifying information is sorted based on the unique ID #xu. In the example illustrated in the drawing, the rights information #2 whose contents ID #2c is "0x12345678ABCD" is stored in the rights information storage site $1713_2$ placed second from the head in the rights information storage region 1721. Therefore, the location identifying information which indicates the storage location of the rights information #2 is "2". The location identifying information "2" is sorted based on the contents ID #2c and stored in the data storage region $1711a_3$ placed third from the head of the sort table 1711. Similarly, the rights information #2 whose unique ID #2u is "0x12345678ABCD" is stored in the rights information storage site $1713_2$ placed second from the head in the rights information storage region 1721. Therefore, the location identifying information which indicates the storage location of the rights information #2 is "2". The location identifying information "2" is sorted based on the unique ID #2u and stored in the data storage region $1711a_{1016}$ placed 1016th from the head of the sort table 1712.

Figure 19:
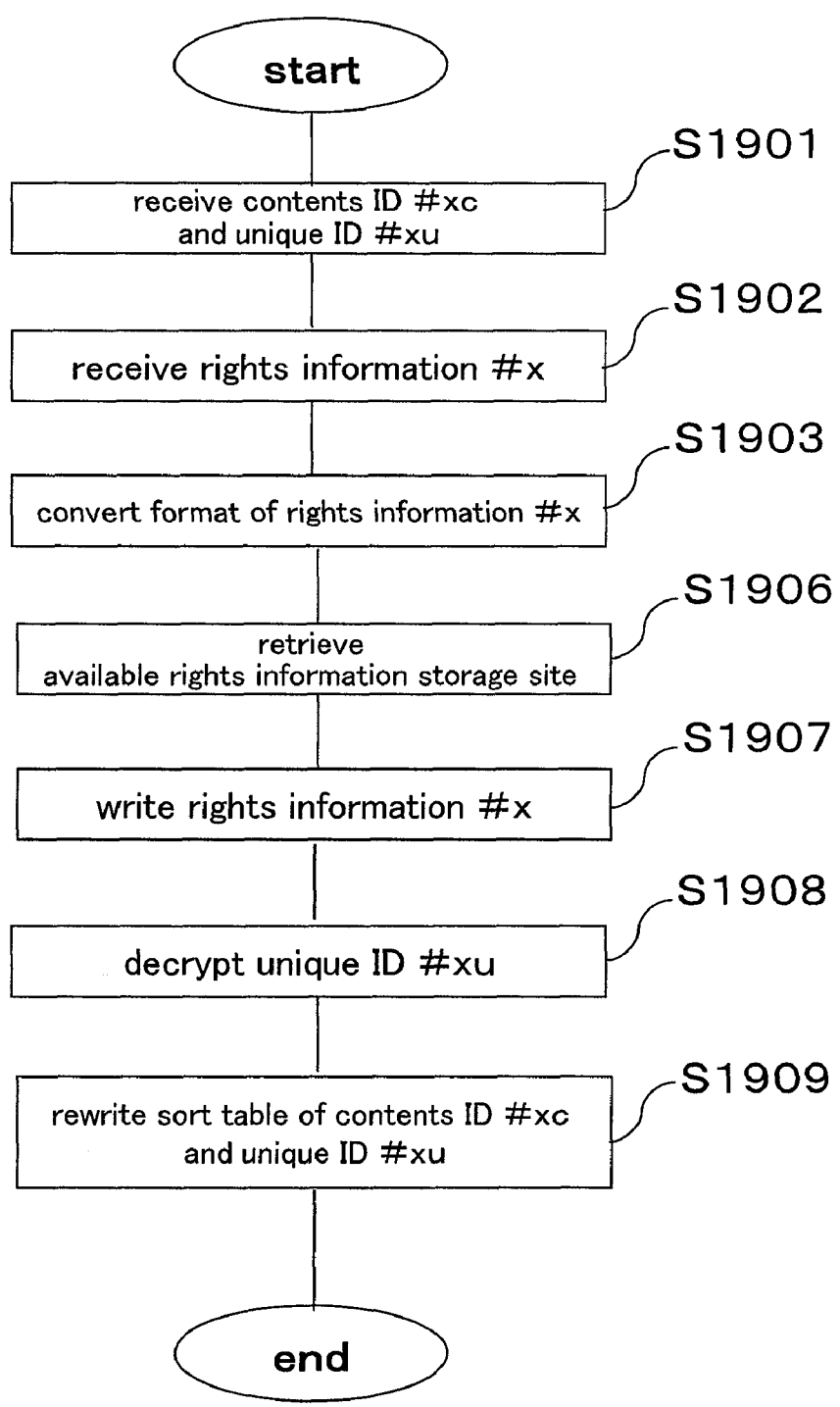
FIG. 19 is a flow chart of processing by an access device (recording) according to the preferred embodiment 4.

Next, an example of a processing sequence in the non-volatile storage device 100 performed when the access device (recording) 300 stores the rights information #x in the non-volatile storage device 100 is described referring to FIG. 19.

Step S1901

First, the recording controller 104 of the memory controller 101 receives the ID information #x (contents ID #xc, unique ID #xu) from the access device (recording) 300 by way of the external I/F unit 102. In the case where the ID information #x (contents ID #xc, unique ID #xu) is included in the rights information #x per se as illustrated in FIG. 18, the processing of Step S1901 is omitted. The ID information #x to be received may be either piece of the ID information #x (contents ID #xc or unique ID #xu). Though not illustrated in the drawing, the access device (recording) 300 and the non-volatile storage device 100 mutually verify that they are authentic as a step prior to Step S601.

Step S1902

Next, the recording controller 104 receives the rights information #x corresponding to the ID information #x from the access device (recording) 300 by way of the external I/F unit 102. The rights information #x may be encrypted in the access device (recording) 300 before it is transmitted. In that case, the memory controller 101 decrypts the rights information (encrypted) #x using the encryptor/decryptor 103, if necessary.

Step S1903

Next, the recording controller 104 converts the rights information received in Step S1902 into data having such a format that can be suitably managed and stored in the protected region 111D.

Step S1906

Next, the recording controller 104 retrieves the rights information storage site $1713_x$ which is available in the rights information storage region 1721 of the protected region 111D.

Step S1907

Next, the recording controller 104 stores the rights information #x converted in Step S1903 in the rights information storage site $1713_x$ whose availability was confirmed in Step S1906.

Step S1908

Next, the recording controller 104 decrypts the unique ID #xu received in Step S1901 using the encryptor/decryptor 103.

Step S1909

Next, the recording controller 104 refers to the sort tables 1711 and 1712 and executes a table rewriting process. Thus, the storage of the rights information #x in the protected region 111D is completed. The tables are rewritten by means of such a method as the Quicksort. More specifically, the locations of the contents ID #xc and the unique ID #cu are calculated in terms of the sorting order, and the location identifying information which identifies the storage position of the rights information #x stored in Step S1907 is stored in the data storage sites $1711a_x$ and $1712a_y$ corresponding to the calculated locations.

Figure 20:
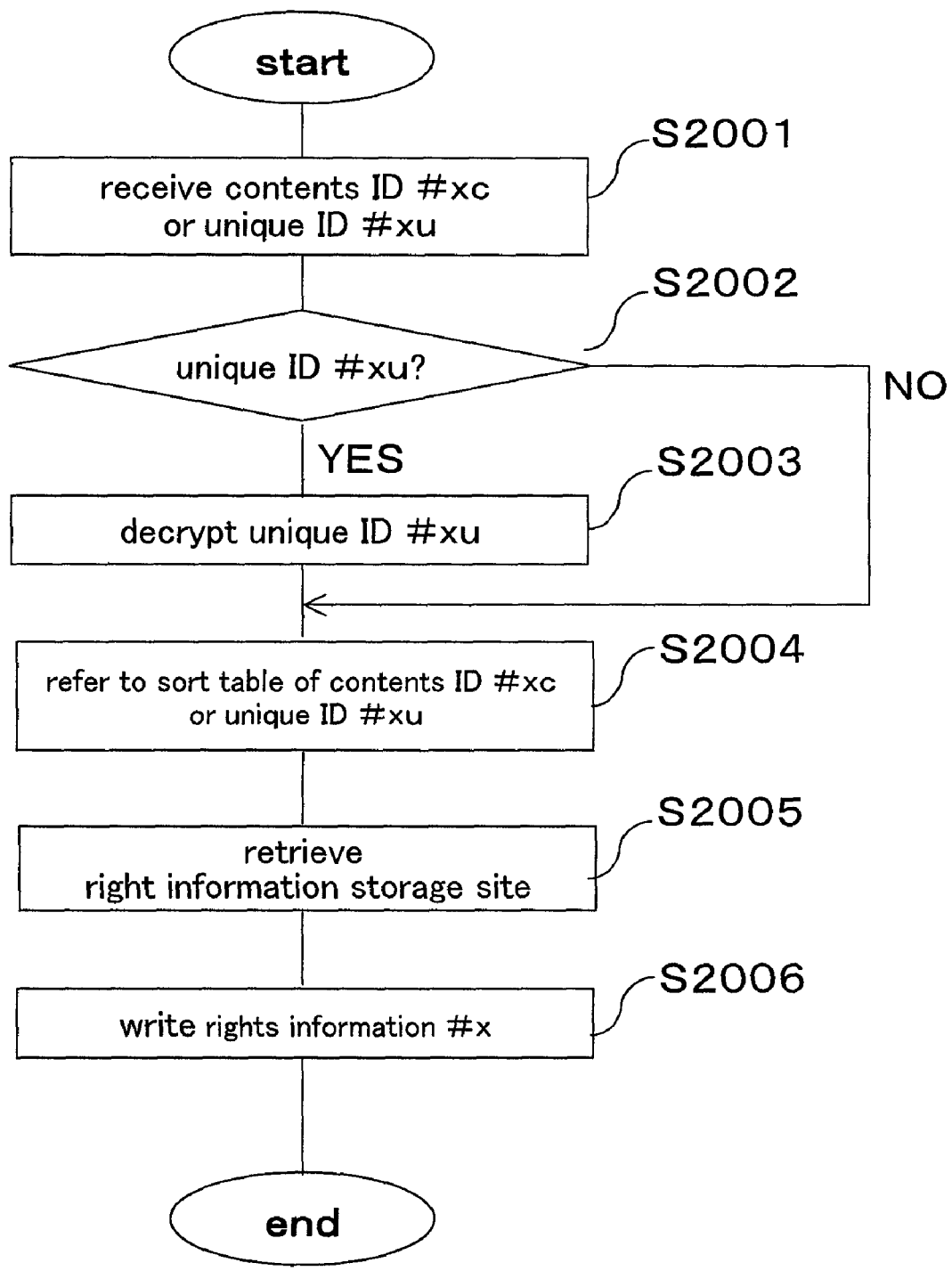
FIG. 20 is a flow chart of processing by an access device (playback) according to the preferred embodiment 4.

Below is described a processing sequence in the non-volatile storage device 100 performed when the access device (playback) 700 reads the rights information from the non-volatile storage device 100 referring to FIG. 20.

Step S2001

First, the recording controller 104 of the memory controller 101 receives either piece of the ID information #x (contents ID #xc or unique ID #xu) from the access device (playback) 700 by way of the external I/F unit 102. Though not illustrated in the drawing, the access device (playback) 700 and the non-volatile storage device 100 mutually verify that they are authentic as a step prior to Step S2001.

S2002

Next, the recoding controller 104 determines whether or not the ID information #x received from the access device (playback) 700 is the unique ID #xu.

Step S2003

Next, when it is determined in Step S1202 that the ID information #x received from the access device (playback) 700 is the unique ID #xu, the recording controller 104 decrypts the unique ID #xu using the encryptor/decryptor 103. When the ID information #x is judged as the contents ID #xc, the recording controller 104 omits the processing of Step S803.

Step S2004

Next, the recording controller 104 refers to (retrieves) the sort table 1711 for contents ID or the sort table 1712 for unique ID. In the sort table 1711, the location identifying information which identifies the storage position of the rights information #x corresponding to the contents ID #xc is stored after being sorted in the order as received, earliest first. In the sort table 1712, the location identifying information which identifies the storage position of the rights information #x corresponding to the unique ID #xu is stored after being sorted in the order as received, earliest first. Through the retrieval, the recording controller 104 identifies the data storage site $1711a_x$ or $1712a_y$ placed in the sorting order corresponding to the contents ID #xc or the unique ID #xu received in Step S2001.

Step S2005

Next, the recording controller 104 reads the location identifying information from the data storage site $1711a_x$ or $1712a_y$ identified in Step S2004, and retrieves the rights information storage region 1721 based on the read location identifying information. Here, the retrieval is made by means of, for example, such a method as the Quicksort. The object of the retrieval in the rights information storage region 1721 is the rights information storage sites $1713_x$ in which the rights information #x corresponding to the contents ID #xc or the unique ID #xu received in Step S2001 is stored.

Step S2006

Next, the recording controller 104 reads the rights information #x from the rights information storage site $1713_x$ identified in Step S2005.

As described, the location identifying information which identifies the positions of the rights information storage sites $1713_{1\text{-}64000}$ in the rights information storage region 1721 is stored in the rights information storage location management region 1720, and then the storage position of the location identifying information (positions of the data storage sites $1712_{1\text{-}64000}$) in the rights information storage location management region 1720 is sorted and managed based on the ID information #x. Thus, the rights information can be retrieved and stored at a higher speed by the non-volatile storage device per se than in the conventional manner where the rights information is stored in the order as received, earliest first. Further, the non-volatile storage device 100, which comprises the encrypting/decrypting feature therein, can directly transmit and receive the encrypted ID information and rights information, which assures a high level of security. Further, the non-volatile storage device 100 per se is capable of speedily retrieving the rights information, and the rights information can always be obtained at a high speed without any dependence on the performance of hardware on the access-device side.

In the preferred embodiment 4, the non-volatile storage device, by which the location identifying information which identifies the storage position of the rights information is sorted and stored/managed based on the ID information, was described. However, the present invention is not necessarily limited thereto, and can be modified within the intended spirit and scope thereof. For example, the following case is included in the present invention.

1) In the description of the preferred embodiment described above, the retrieval of the rights information is based on the two pieces of ID information (contents ID, unique ID). However, the number of pieces of ID information corresponding to the rights information may be other than two, in which case the required number of ID sort management tables are secured and managed depending on the number of pieces of the ID information.

Preferred Embodiment 5

Figure 21:
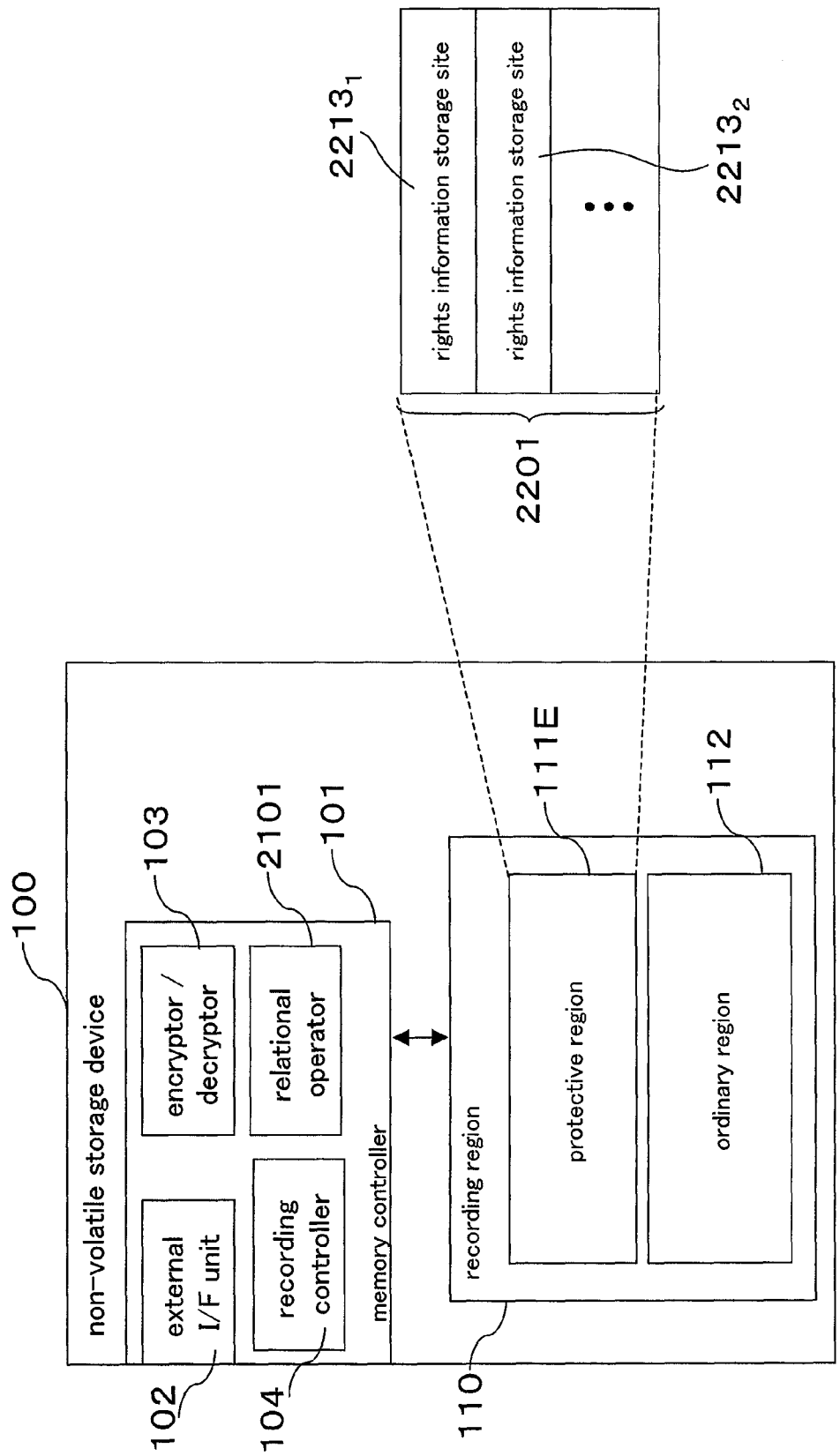
FIG. 21 is an illustration of a constitution of a non-volatile storage device according to a preferred embodiment 5 of the present invention.
Figure 22:
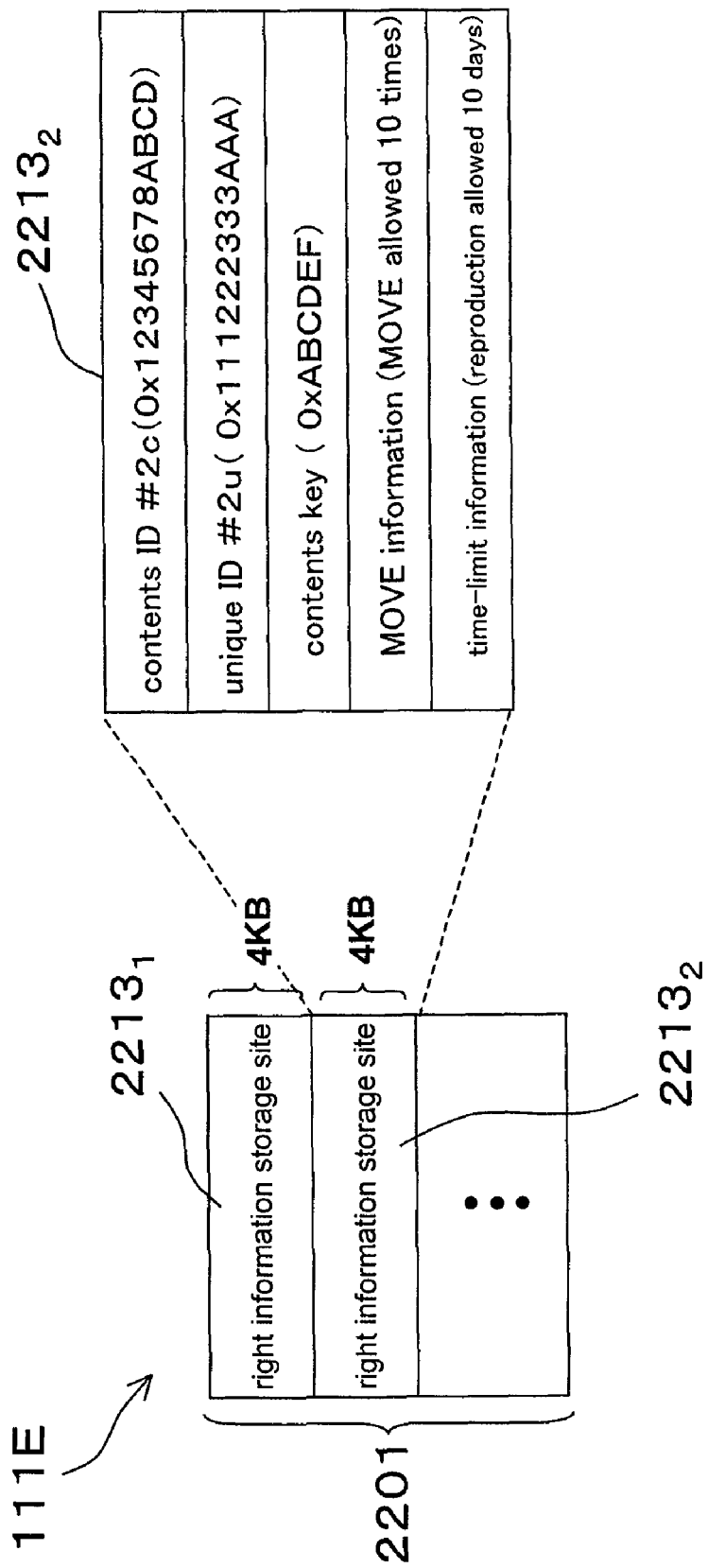
FIG. 22 is a first illustration of a constitution of rights information according to the preferred embodiment 5.

Hereinafter, a preferred embodiment 5 of the present invention is described in detail referring to the drawings. FIG. 21 is an illustration of a constitution inside the non-volatile storage device 100. FIG. 22 is an illustration of a constitution of the rights information in the non-volatile storage device 100.

The present preferred embodiment is different to the preferred embodiment 1 in that a relational operator 2101 capable of executing a high-speed relational operation is provided in the memory controller 101 of the non-volatile storage device 100. The present preferred embodiment is further different to the preferred embodiment 1 in a constitution of the storage of the rights information in a protected region 111E of the non-volatile storage device 100. The rest of the non-volatile storage device 100, access device (recording) 300, and access device (playback) 700 have the same constitutions as in the preferred embodiment 1. Therefore, the detailed description of them is omitted.

The protected region 111E of the non-volatile storage device 100 is provided with a rights information storage region 2201. The rights information storage region 2201 is provided with a plurality of rights information storage sites $2213_{1,2}, \ldots$ each having a certain size. In each of rights information storage sites $2213_{1,2}, \ldots$, any of the rights information #1, #2, ... is stored.

In FIG. 22, the rights information #2, which is an example of the rights information #1, 2, ..., is stored in the rights information storage site $2213_2$. The rights information #2 includes the following details of rights:

The ID information #2 (contents ID #2c, unique ID #2u) is "0x12345678ABCD" and "0x111222333AAA;"

The contents key is "0xABCDEF;"

The MOVE information is "MOVE allowed 10 times;" and

The time-limit information is "playback allowed 10 days."

Figure 23:
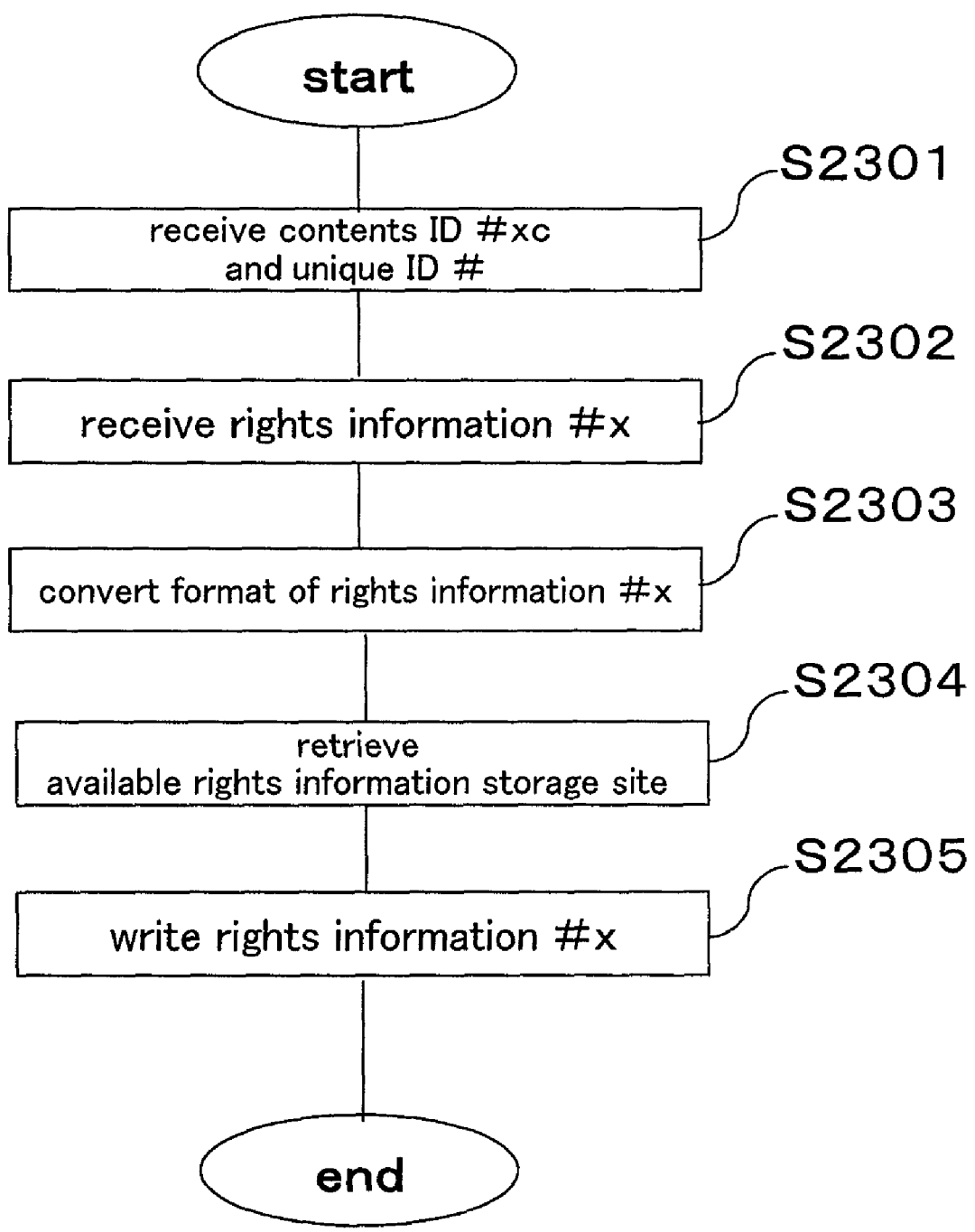
FIG. 23 is a flow chart of processing by an access device (recording) according to the preferred embodiment 5.

Next, an example of a processing sequence of the non-volatile storage device 100 performed when the access device (recording) 300 stores the rights information #x in the non-volatile storage device 100 is described referring to FIG. 23.

Step S2301

First, the recording controller 104 of the memory controller 101 receives the ID information #x (contents ID #xc, unique ID #xu) from the access device (recording) 300 by way of the external I/F unit 102. In the case where the ID information #x (contents ID #xc, unique ID #xu) is included in the rights information #x as illustrated in FIG. 22, the processing of Step S601 is omitted. The ID information #x to be received may be either piece of the ID information #x (contents ID #xc or unique ID #xu). Though not illustrated in the drawing, the access device (recording) 300 and the non-volatile storage device 100 mutually verify that they are authentic as a step prior to Step S2301.

Step S2302

Next, the recording controller 104 receives the rights information #x corresponding to the ID information #x from the access device (recording) 300 by way of the external I/F unit 102. The rights information #x may be encrypted in the access device (recording) 300 before it is transmitted. In that case, the recoding controller 104 decrypts the rights information (encrypted) #x using the encryptor/decryptor 103, if necessary.

Step S2303

Next, the recording controller 104 converts the rights information #x received in Step S602 into data having such a format that can be suitably managed and stored in the protected region 111E.

Step S2304

Next, the recording controller 104 retrieves a rights information storage site $2213_x$, which is available in the rights information storage region 2201 of the protected region 111E.

Step S2305

Next, the recording controller 104 stores the rights information #x converted in Step S603 in the rights information storage site $2213_x$, whose availability was confirmed in Step S604.

Below is described an example of a processing sequence of the non-volatile storage device 100 performed when the access device (playback) 700 reads the rights information from the non-volatile storage device 100 referring to FIG. 24.

Step S2401

First, the recoding controller 104 of the memory controller 101 receives either piece of the ID information #x (contents ID #xc or unique ID #xu) from the access device (playback) 700 by way of the external I/F unit 101. Though not illustrated in the drawing, the access device (playback) 700 and the non-volatile storage device 100 mutually verify that they are authentic as a step prior to Step S2401.

Step S2402

Then, the recording controller 104 determines whether or not the ID information #x received from the access device (playback) 700 is the unique ID #xu.

Step S2403

Next, when it is determined in Step S802 that the ID information #x received from the access device (playback) 700 is the unique ID #xu, the recording controller 104 decrypts the unique ID #xu using the encryptor/decryptor 103. When the ID information #x is judged as the contents ID #xc, the recording controller 104 does not implement Step S2403.

Step S2404

Next, the recoding controller 104 sends an instruction to implement the following processing to the relational operator 2101. More specifically, the relational operator 2101 collates the ID information #1, 2, ... (contents IDs #1c, 2c, ..., unique IDs #1c, 2c, ...) received in Step S2401 with the ID information #1, 2, ... (contents IDs #1c, 2c, ..., unique IDs #1c, 2c, ...) included in the rights information #1, 2, ... stored in the rights information storage region 2201 of the protected region 111E. Accordingly, the relational operator 2101 retrieves the rights information #1, 2, ... corresponding to the ID information #1, 2, ... received in Step S2401 in the rights information storage region 2201. The relational operator 2101 performs the collation and retrieval at a high speed in the relational operation. The recording controller 104 obtains 7 from the rights information storage region 2201 the rights information #x which was found to have the same ID information as a result of the retrieval by the relational operator 2101.

As described, in the present preferred embodiment, the rights information can be quickly stored inside, and the retrieval of the rights information can be accelerated by means of the dedicated relational operator 2101 provided in the non-volatile storage device 100. Further, the non-volatile storage device 100, which comprises the encrypting/decrypting feature therein, can directly transmit and receive the encrypted ID information and rights information, which assures a high level of security. Further, the non-volatile storage device 100 per se is capable of speedily retrieving the rights information, and the rights information can always be obtained at a high speed without any dependence on the hardware performance on the access-device side.

In the description of the preferred embodiment 5, the relational operator 2101 is provided in the non-volatile storage device 100, so that the retrieval of the ID information is accelerated. However, the present invention is not necessarily limited thereto, and can be modified within the intended sprit and scope thereof. For example, the following case is included in the present invention.

1) In the description of the preferred embodiment described above, the retrieval of the rights information is based on the two pieces of ID information (contents ID, unique ID). However, the number of pieces of ID information corresponding to the rights information is not necessarily limited to two.

Preferred Embodiment 6

In the preferred embodiment 5, the rights information and the ID information are managed (as a block) in the same region of the non-volatile storage device. In a preferred embodiment 6 of the present invention, the ID information and the rights information are separately managed. The rest of the constitution, which is the same as that of the preferred embodiment 5, will not be described.

FIG. 25 illustrates a data constitution in the non-volatile storage device 100 according to the preferred embodiment 6. In the present preferred embodiment, a rights information storage location management region 2500 and a rights information storage region 2501 are provided in a protected region 111F. A table 2511 for contents ID and a table 2512 for unique ID are provided in the rights information storage location management region 2500, and rights information storage sites $2513_{1\text{-}64000}$ are provided in the rights information storage region 2501. In the table 2511 for contents ID, a pointer in the table 2512 for unique ID and the contents ID #x in a state that they are associated with each other. The pointer denotes positional information which identifies, in the table 2512 for unique ID, the position of the data relating to the unique ID #xu which pairs up with the contents ID #xc in the ID information #x. In the table 2512 for unique ID, the pointer in the rights information storage region 2501 and the unique ID #xc are stored in the state that they are associated with each other. The pointer information denotes positional information which identifies, in the rights information storage region 2501, the position of the rights information storage site $2513_x$ in which the rights information #x corresponding to the unique ID #xc is stored.

Figure 26:
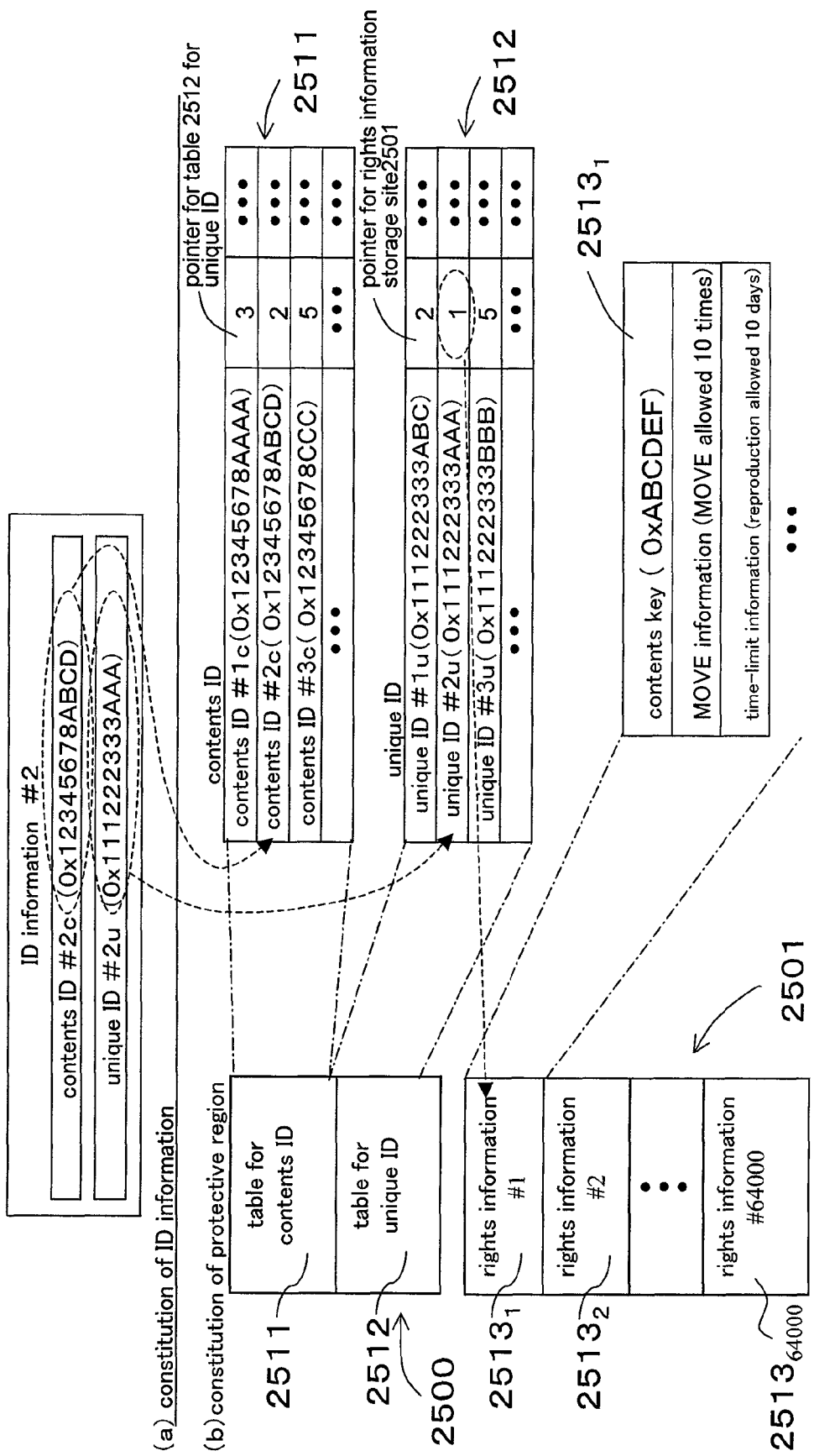
FIG. 26 is a detailed illustration of the constitution of the rights information according to the preferred embodiment 6.

FIG. 26 illustrates a constitution of the ID information #2 which is an example of the ID information #x, and a constitution of the storage of the rights information #1-#64000 including the rights information #2 corresponding to the ID information #2 in the protected region 111E. In the ID information #2, the contents ID #2c is "0x123345678ABCD," and the unique ID #2u is "0x111222333AAA." At the second record in the table 2511 for contents ID, a pointer "2" in the table 2512 for unique ID and the contents ID #2c are stored after being associated with each other. Accordingly, it can be known that the contents ID #2c is linked to the second record in the table 2512 for unique ID.

At the second record in the table 2512 for unique ID associated with the contents ID #2c, the unique ID #2u which pairs up with the contents ID #2c in the ID information #2 and a pointer "1" corresponding to the unique ID #2u are stored after being associated with each other. In the rights information storage site $2513_1$ in the rights information storage region 2501 associated with the pointer "1", the rights information #1 is stored. Thus, the contents ID #xc and the unique ID #xu are managed independently from the rights information #x. The relational operator 2101 retrieves the rights information x referring to the table 2511 for contents ID and the table 2512 for unique ID managed independently from the rights information #x.

The following modified embodiments, for example, applicable to all the preferred embodiments 1-6 described so far are included as the present invention.

1) An example of the non-volatile storage device 100 described in the preferred embodiments is provided with a semiconductor recording medium; however, the non-volatile storage device 100 may be provided with a magnetic recording medium or may be an electronic device provided with a recording-medium function.

2) In the preferred embodiments described so far, only the unique ID #xu of the ID information #x is encrypted. However, the contents ID #xc may also be encrypted, and the case where neither the contents ID #xc nor the unique ID #xu is encrypted is also applicable. Further, encryption is not the only method. Authentication through a one-way functional operation and any other method to verify whether the ID information is correct may be adopted.

3) In the description of the preferred embodiments, the size of the ID information #x is 4 KB, and the largest number of pieces of the information to be stored is 64,000. However, the size and the number are not necessarily limited thereto and any size and number are applicable.

4) In the description of the preferred embodiments, the rights information #x is stored in the protected region 111 without being encrypted. However, all of the data in the protected region 111 may be stored after being encrypted in order to enhance security.

5) In the description of the preferred embodiments, the memory controller 101 has the function of controlling each function of the structural components of the non-volatile storage device 100. However, the memory controller 101 may be software installed from the access device (recording) 300 to operate as application software of the non-volatile storage device 100. Further, the software may be preinstalled in the non-volatile storage device 100.

INDUSTRIAL APPLICABILITY

The present invention is characterized in that a non-volatile storage device per se is configured to have the function of writing and reading rights information at a high speed, and the present invention is applicable to a data storage method for a recording medium.

What is claimed is:

1. A memory controller connected to a non-volatile memory for writing data and ID information associated with the data in the non-volatile memory and reading the data and the ID information from the non-volatile memory based on an access instruction supplied from outside of the non-volatile memory, comprising:
an external I/F unit for receiving the ID information associated with the data from the outside of the non-volatile memory; and
a recording controller for managing a recording position of the data in the non-volatile memory based on the ID information, wherein
the recording controller sets a storage position of the data in the non-volatile memory based on the ID information associated with the data and a hash calculation result of the ID information associated with the data, and
wherein the recording controller sets in the non-volatile memory a data storage region for storing a plurality of the data and a data storage location management region for storing location identifying information which identifies a storage position of the data in the data storage region,
when the data is stored in the data storage region, the recording controller sets a position in the data storage location management region for storing the location identifying information corresponding to the data based on the ID information corresponding to the data, and stores the location identifying information of the data at the set position in the data storage location management region, and
when the data is read from the data storage region, the recording controller identifies the position in the data storage location management region based on the ID information corresponding to the data and reads the location identifying information relating to the data from the identified position, and identifies the storage position of the data in the data storage region based on the read location identifying information.

2. The memory controller as claimed in claim 1, wherein the recording controller generates intermediate data having a data list structure having a certain length based on the ID information, and sets the position in the data storage location management region at which the location identifying information corresponding to the data is to be stored based on the intermediate data.

3. The memory controller as claimed in claim 2, wherein the intermediate data is a hash value calculated by hash function.

4. The memory controller as claimed in claim 1, wherein the recording controller sets the position in the data storage location management region at which the location identifying information corresponding to the data is to be stored in the order as sorted based on the ID information.

5. A memory controller connected to a non-volatile memory for writing data and ID information associated with the data in the non-volatile memory and reading the data and the ID information from the non-volatile memory based on an access instruction supplied from outside of the non-volatile memory, comprising:
an external I/F unit for receiving the ID information associated with the data from the outside of the non-volatile memory; and
a recording controller for managing a recording position of the data in the non-volatile memory based on the ID information, wherein
the recording controller sets a storage position of the data in the non-volatile memory based on the ID information associated with the data, and
when the data is stored in the non-volatile memory, the recording controller divides the non-volatile memory into a plurality of divided regions identified based on the intermediate data, and stores the data in one of the divided regions identified based on the intermediate data corresponding to the data, and,
when the data is read from the non-volatile memory, the recording controller identifies one of the plurality of divided regions in the non-volatile memory based on the ID information associated with the data, and identifies the storage position of the data by retrieving the identified divided region.

6. The memory controller as claimed in claim 5, wherein the intermediate data is a hash value calculated by hash function.

7. A data management method for writing data and ID information associated with the data in a non-volatile memory based on an access instruction supplied from the outside of the non-volatile memory and reading the data and the ID information from the non-volatile memory, comprising:
- a first step for receiving the ID information associated with the data from the outside of the non-volatile memory; and
- a second step for managing a recording position of the data in the non-volatile memory based on the received ID information, wherein the second step includes:
- a third step for setting a data storage region in which a plurality of the data are to be stored and a data storage location management region in which location identifying information which identifies a storage position of the data in the data storage region is to be stored in the non-volatile memory;
- a fourth step for setting a position in the data storage location management region at which the location identifying information corresponding to the data is to be stored based on the ID information associated with the data and storing the location identifying information of the data at the set position in the data storage location management region when the data is stored in the data storage region; and
- a fifth step for identifying the position in the data storage location management region based on the ID information associated with the data, reading the location identifying information relating to the data from the identified position, and identifying a storage position of the data in the data storage region based on the read location identifying information when the data is read from the data storage region.

8. The data management method as claimed in claim 7, wherein intermediate data having a data list structure having a certain length is generated based on the ID information, and the position in the data storage location management region at which the location identifying information corresponding to the data is to be stored is set based on the intermediate data in the fourth step.

9. The data management method as claimed in claim 8, wherein a hash value calculated by hash function is generated as the intermediate data based on the ID information in the fourth step.

* * * * *